United States Patent [19]

Sakata

[11] Patent Number: 4,893,194

[45] Date of Patent: Jan. 9, 1990

[54] MULTI-COPY SYSTEM FOR A DIGITAL COPIER

[75] Inventor: Seiji Sakata, Yokohama, Japan

[73] Assignee: Ricoh Company, Ltd., Tokyo, Japan

[21] Appl. No.: 191,328

[22] Filed: May 9, 1988

[30] Foreign Application Priority Data

May 9, 1987 [JP] Japan .................................. 62-113073

[51] Int. Cl.⁴ ................................................ H04N 1/40
[52] U.S. Cl. ..................................... 358/443; 358/410; 358/451
[58] Field of Search ............... 358/287, 280, 285, 293, 358/264; 355/8, 14 C; 382/61

[56] References Cited

U.S. PATENT DOCUMENTS

| | | | |
|---|---|---|---|
| 4,342,052 | 7/1982 | Rackley et al. | 358/280 |
| 4,580,171 | 4/1986 | Arimoto | 358/280 |
| 4,636,869 | 1/1987 | Tomoshisa et al. | 358/287 |
| 4,652,936 | 3/1987 | Hatayama | 358/280 |
| 4,655,582 | 4/1987 | Okuda et al. | 355/14 R |

*Primary Examiner*—James J. Groody
*Assistant Examiner*—Kim Yen Vu
*Attorney, Agent, or Firm*—Oblon, Spivak, McClelland, Maier & Neustadt

[57] ABSTRACT

A multi-copy system for a digital copier includes store means for storing data which are provided by one main scanning. The data stored in the store means are produced a plurality of times within a period of time of one main scanning to provide a multi-copy. Different types of lines such as phantom lines, solid lines and similar borders may be generated between the multiple copies.

4 Claims, 31 Drawing Sheets

F/G.6

FIG.23a
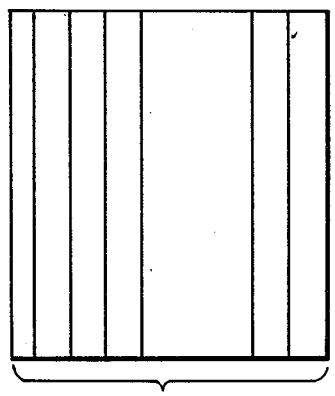
VERTICAL LINES
FIG.23b
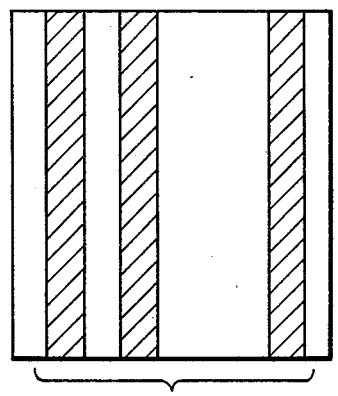
VERTICAL LINES
FIG.23c
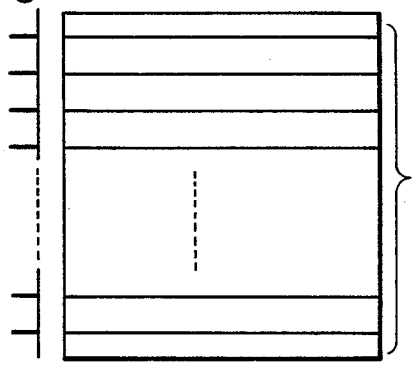
HORIZONTAL LINES
FIG.23d
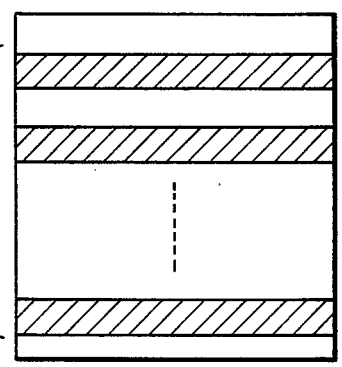
HORIZONTAL LINES

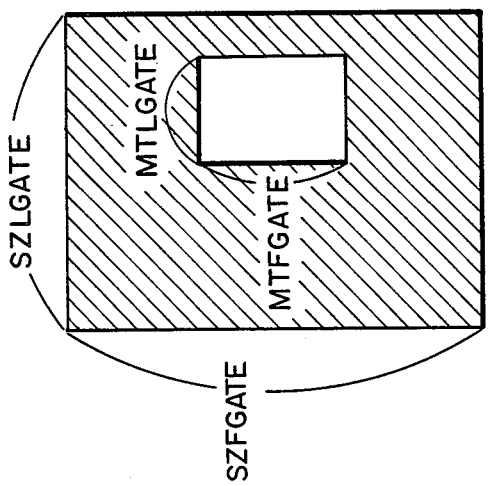
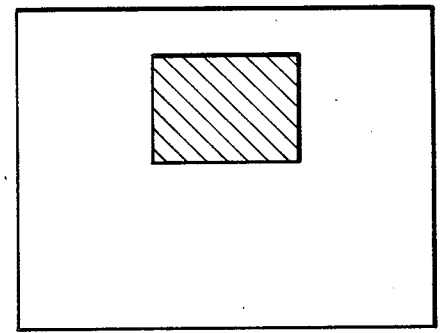
FIG. 26

FIG. 27
(a) 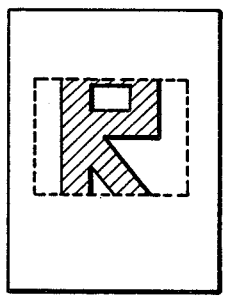
(b) 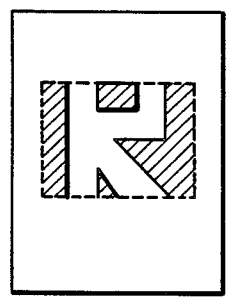
(c) 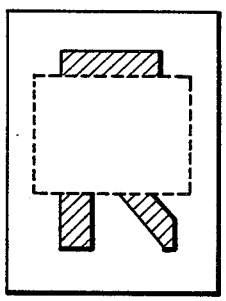
(d) 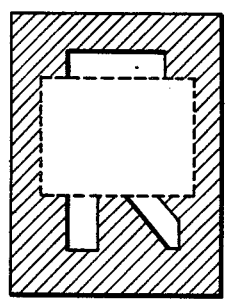
(e) 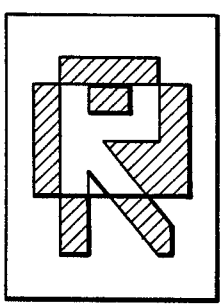
(f) 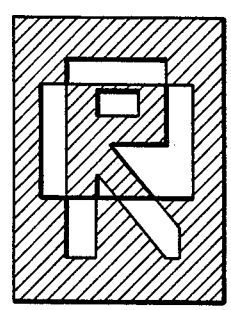

MULTI-COPY SYSTEM FOR A DIGITAL COPIER

BACKGROUND OF THE INVENTION

The present invention relates to image editing which may be performed with a digital copier.

With a prior art analog copier, a capability of outputting a plurality of images by a single copying operation, i.e., a multi-copy capability is difficult to achieve.

SUMMARY OF THE INVENTION

It is therefore an object of the present invention to improve a multi-copy and other image editing functions which are available with a digital copier.

It is another object of the present invention to provide a generally improved multi-copy system for a digital copier.

A multi-copier system for a digital copier of the present invention comprises store means for storing data which are provided by one main scanning, and data generally means for generating the data stored in the store means a plurality of times within a period of time of one scanning.

BRIEF DESCRIPTION OF THE DRAWINGS

The above and other objects, features and advantages of the present invention will become more apparent from the following detailed description taken with the accompanying drawings in which:

FIG. 23 is a diagram showing how a test pattern is produced;

FIGS. 26 and 27 are diagrams each showing a particular marked area;

DESCRIPTION OF THE PREFERRED EMBODIMENT

Figure 1:
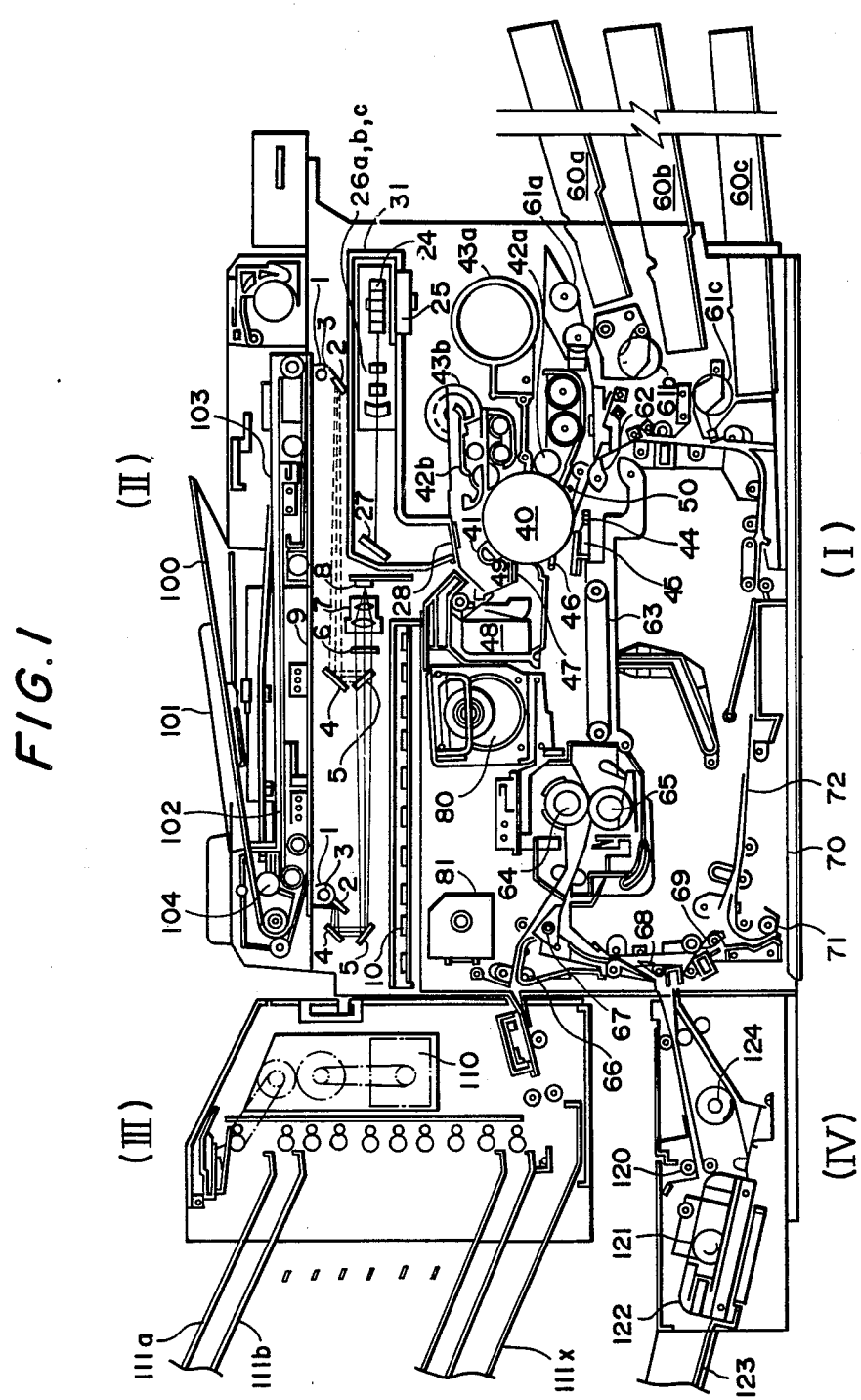
FIG. 1 is a view showing the overall construction of a digital copier in accordance with the present invention.
Figure 2:
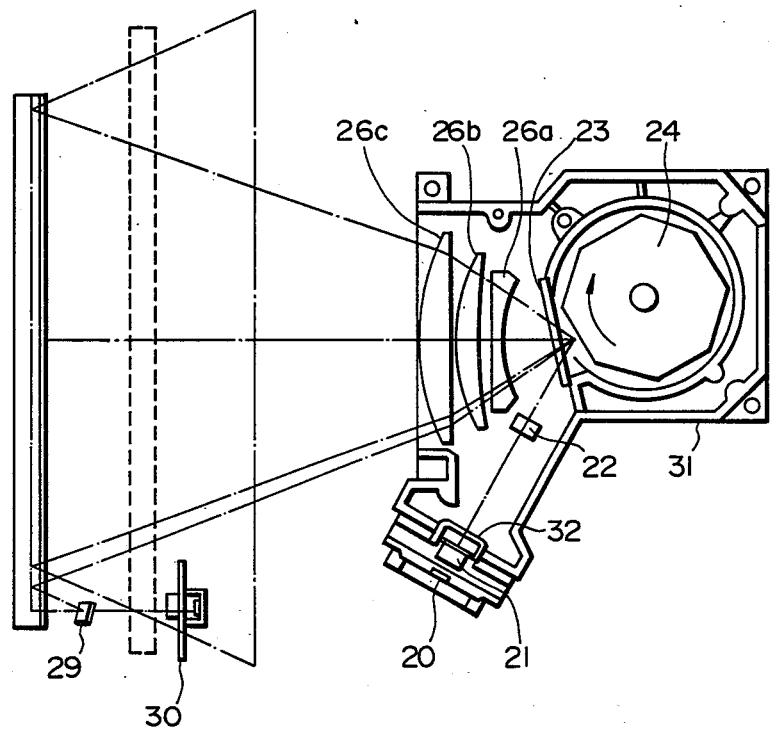
FIG. 2 is a plan view of a writing section.

Referring to FIG. 1 of the drawings, a digital copier in accordance with the present invention is shown. As shown, the digital copier is made up of four units, i.e., a copier body (I), an ADF (II), a sorter (III), and a two-sided reversal unit (IV). The copier body (I) includes a scanner section, a writing section, a photoconductive element section, a developing section, and a sheet feed section which are constructed and operated as follows.

(Scanner Section)

A first scanner having a mirror 1, a light source 3 and a first mirror 2 is movable at a predetermined speed. A second scanner is movable at half the speed of the first scanner and provided with a second mirror 4 and a third mirror 5. The first and second scanners optically scan an original document, not shown, which is laid on glass platen 9. Imagewise light from the document is incident to a lens 7 via color separating filter 6 and then focused onto a one dimensional solid plate imaging device 8.

While the light source may be implemented with a fluorescent lamp, halogen lamp or the like, use is commonly made of a fluorescent lamp which has stable wavelength and long service life. Although one light source 3 is used in the illustrative embodiment, two or more light sources 3 may be used as desired. Since imaging device 8 has a constant sampling clock, a fluorescent lamp has to be turned on at a higher frequency than the sampling clock in order to eliminate adverse influence on an image.

Usually, the imaging device 8 is implemented by a CCD. An image signal read by the imaging device 8 which is an analog signal is converted into a digital signal and then subjected to various kinds of image processing (binarization, tone processing, magnification change, edition, etc.) at an image processing board 10 to become a digital signal in the form of congregation of spots.

In this particular embodiment, the color separating filter 6 is movable into and out of an optical path which extends from the document to the imaging device 8 for the purpose of transmitting only the information associated with a necessary color. While the document is scanned, the filter 6 is removed into and out of the optical path to selectively enable a multi-transfer function, a two-sided copy function and other various functions to produce a variety of kinds of copies as desired.

(Writing Section)

The image data undergone image processing are written on a photoconductive drum 40 in the form of congregation of light spots by raster scanning which uses a laser beam. While the laser beam may be implemented by a helium-neon (Ne-Ne) laser which has a wavelength of 633 nanometers and well matches to the sensitivity of a photoconductive element of a copier, it is very expensive and cannot be modulated without resorting to the intermediary of a complicated arrangement. In the illustrative embodiment an inexpensive and directly modulatable semiconductor laser is used taking account of the recent improvement in the sensitivity of a photoconductive element.

Light issuing from a semiconductor laser 20 is collimated into a parallel beam by a collimating lens 21 and then shaped by an aperture 32 to become a beam having a predetermined shape. This beam is compressed in the subscanning direction by a first cylindrical lens 22 and then directed toward a polygon mirror 24. Having an accurate polygonal cross-section, the polygon mirror 24 is rotated by a polygon motor 25 at a predetermined speed in a predetermined direction. The rotation speed of the mirror 24 is determined on the basis of the rotation speed and writing density of a photoconductive drum 40 as well as the number surfaces of the polygon mirror 24.

The laser beam incident to the polygon mirror 24 is deflected by the mirror 24 toward f-theta lenses 26a, 26b and 26c. Functions assigned to the f-theta lenses 26a to 26c are scanning the drum 40 at a constant rate by the laser beam whose angular velocity is constant, focusing the light beam onto the drum 40 such that the beams forms a minimum light spot, and compensating for tilting.

In a position outside of an image area, the laser beam coming out from the f-theta lenses 26a to 26c is reflected by a mirror 29 to reach a synchronization sensor 30. When a predetermined period of time expires since the synchronization sensor 30 has produced a synchronization signal representative of a head signal in the main scanning direction, one line of image data are delivered. This procedure is repeated thereafter to complete one full image.

(Photoconductive Element Section)

The photoconductive drum 40 has a photoconductive layer on its outermost periphery. In this embodiment, the photoconductive layer is implemented by an organic photoconductor (OPC) which is sensitive to the wavelength of 780 nanometers of a semiconductor layer, e.g. a-Si or Se-Te. As regards laser writing, while a negative/positive (N/P) process for illuminating an image area and a positive/positive (P/P) process for illuminating a background area are available, this embodiment uses the N/P process.

A charger 41 is provided with a grid adjacent to the drum 40 and uniformly charges the surface of the drum 40 to negative polarity. The laser beam illuminates an image area of the drum surface to lower its potential. As a result, a latent image is electrostatically formed in which the potential is about −750 volts to −800 volts in a background area and about −500 volts in an image area. A bias voltage of −500 volts to −600 volts is applied to a developing roller of any of developing units 42a and 42b to deposite negatively charged toner on the latent image, whereby the latent image is converted into a toner image.

(Developing section)

A main developing unit 42a and an auxiliary developing unit 42b are used in the illustrative embodiment. In a black-and-white reproduction mode, the auxiliary developing unit 42b and a toner container 43b associated therewith are removed. Specifically, a toner container 43a associated with the main developing unit 42a and the toner container 43b associated with the auxiliary developing unit 42b store black toner and color toner, respectively. The developing units 42a and 42b are selectively conditioned for development by, for example, changing the position of a main pole of one developing unit while the other developing unit is operated. This kind of development may be combined with the operation of the filter 6 and a multiple transfer function and a two-side copy function of a paper transport system in order to produce various kinds of color copies while editing color image data. Development in three or more colors may be implemented by three or more developing units which are fixedly arranged around the drum 40 or angularly movable to selectively reach a developing station.

The toner image produced by any of the developing units 42a and 42b is charged by a transfer charger 44 from behind to positive polarity and thereby transferred to a paper which is fed in synchronism with the rotation of the drum 40. The paper with the toner image is subjected to AC discharge by a separation charger 45 which is held integrally with the transfer charger 44, whereby it is removed from the drum 40. Toner remaining on the drum 40 without being transferred to the paper is scraped off from the drum 40 by a cleaning blade 47 and then collected in a tank 48. Further, the potential pattern remaining on the drum 40 is erased by a discharging lamp 49.

A photosensor 50 is located immediately after the developing station. Constituted by a light-emitting element and a light-sensitive element, the photosensor 50 is adapted to measure the image density in terms of a ratio between the reflectivity of a pattern portion and that of the other portion which are defined on the drum 40 by writing a predetermined pattern (black pattern or dot pattern) in a position corresponding to the photosensor 50 and developing it. When the image density measured is low, the photosensor 50 produces a toner supply signal. That the density does not increase even after the supply of toner may show that the remaining amount of toner is short.

(Paper Feed Section)

In this embodiment, the paper feed section includes a plurality of cassettes 60a, 60b and 60c. A paper with a toner image may be routed through a re-feed loop 72 for producing a two-sided copy or for feeding it again. When any of the cassettes 60a to 60c is selected and then a start button is depressed, a feed roll 61 (61a, 61b or 61c) is rotated to feed a paper until the paper abuts against a register roller 62 which is in a halt then. Timed to an image position on the drum 40, the register roller 62 begins to rotate to drive the paper to feed the paper toward the periphery of the drum 40. After the toner image has been transferred from the drum 40 to the paper at a transfer station, the paper is transported by a separation and transport section 63 to a fixing roller pair which is constituted by a heating roller 64 and a pressing roller 65, the fixing roller pair fixing the toner image on the paper.

In a usual copy mode, the paper with the toner image fixed thereon is directed by a pawl 67 toward an outlet which adjoins the sorter (III). In a multi-copy mode, the paper is guided by the separator pawl 67 downward and, without being redirected by other selector pawls 68 and 69, routed through the loop 72 to reach the register roller 62 again. A two-side copy mode may be selectively effected by the copier body (I) only or by the copier body (I) and the two-side reversal unit (IV). When only the copier body (I) is used, the paper directed downward by the selector pawl 67 is fed further downward by the pawl 68 and then guided by the pawl 69 toward a tray 70 which is located below the loop 72. Then, a roller 71 is actuated to return the paper toward the selector pawl 69 which, at this time, is oriented to guide the paper into the loop 72, so that the paper reaches the register roller 62.

(ADF)

The ADF (II) serves to automatically feed original documents one by one onto the glass platen 9 and then discharge them after they have been scanned. Specifically, documents stacked on a feed tray 100 are positioned in the widthwise direction by using a side guide 101. A feed roll 104 feeds one document at a time from the stack on the feed tray 100 and then a belt 102 transports the document to a predetermined position on the glass platen 9. After a desired number of copies have been produced, the belt 102 is actuated again to discharge the document to a discharge tray 103. The size of the document may be detected by sensing the position of the side guide 101 selected and counting the feed time.

(Sorter)

The sorter (III) is usable to distribute copies coming out of the copier body (I) to bins 111a to 111x in a manner well known in the art. By a plurality of rollers which are rotated by a motor 110, the copies are distributed to selected ones of the bins 111a to 111x depending upon the positions of pawls which are individually located in the vicinity of the bins.

(Two-Side Reversal Unit (IV))

The two-side reversal unit (IV) helps the copier body (I) produce multiple two-sided copies collectively. Specifically, papers fed downward by the discharge roller 66 are guided by the pawl 67 into the two-side reversal unit (IV). In the unit (IV), the papers are sequentially stacked on a tray 123 by a discharge roller 120 while being positioned by a feed roller 121 and a side guide 122. The papers on the tray 123 are sequentially fed out of the unit (IV) by a re-feed roller 124 when the timing for copying a document on their back is reached. At this instant, the papers are directly driven into the loop 72 by the pawl 69 and therefrom to the register roller 62. Further shown in FIG. 1 are a glass 23 for insulating sound, a mirror 27, a glass 28 for intercepting dust, a main motor 80, and a fan motor 81.

(Electrical Control Section)

Figure 3A:
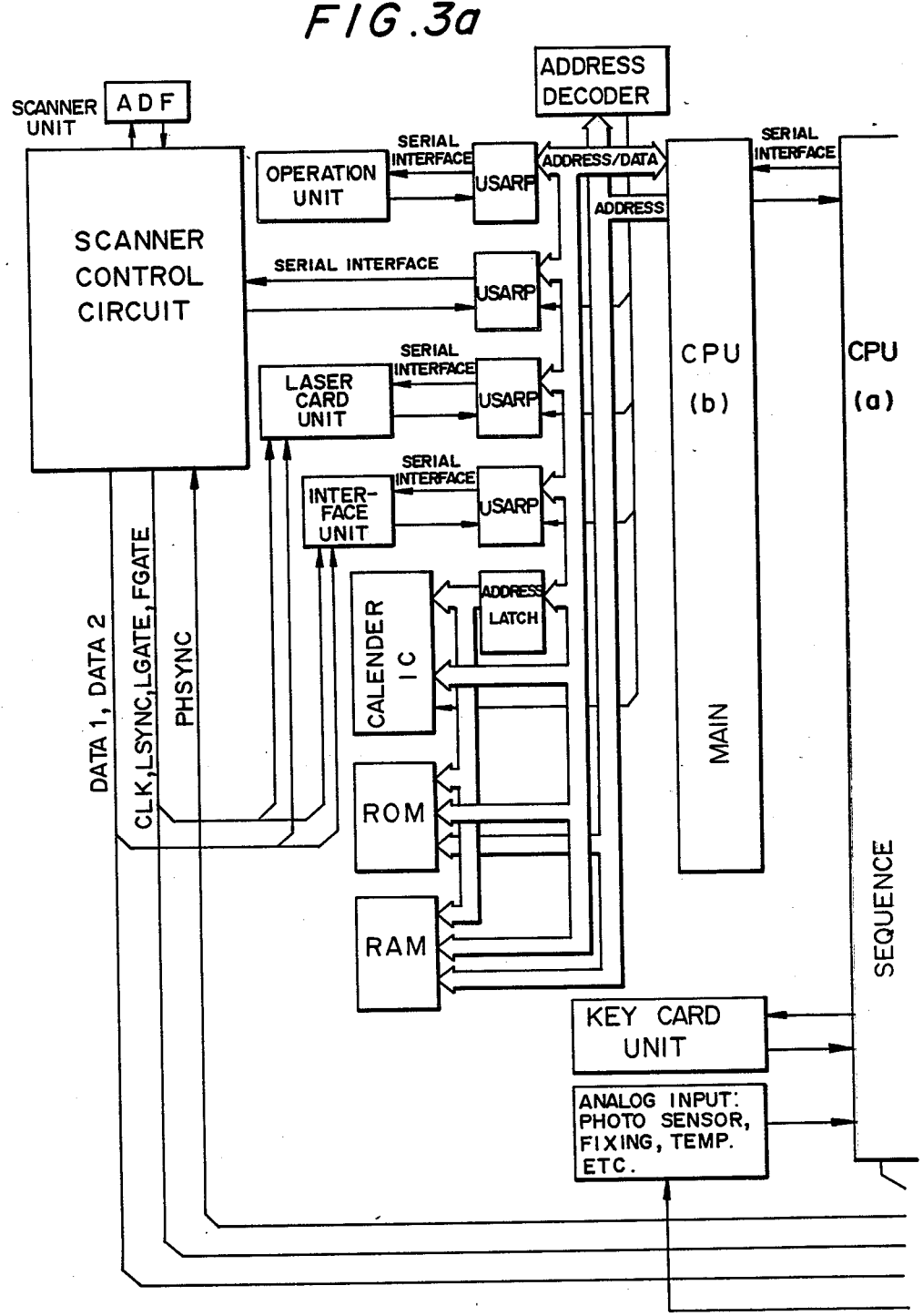
FIGS. 3a and 3b are schematic block diagrams showing a printer section when combined.
Figure 3B:
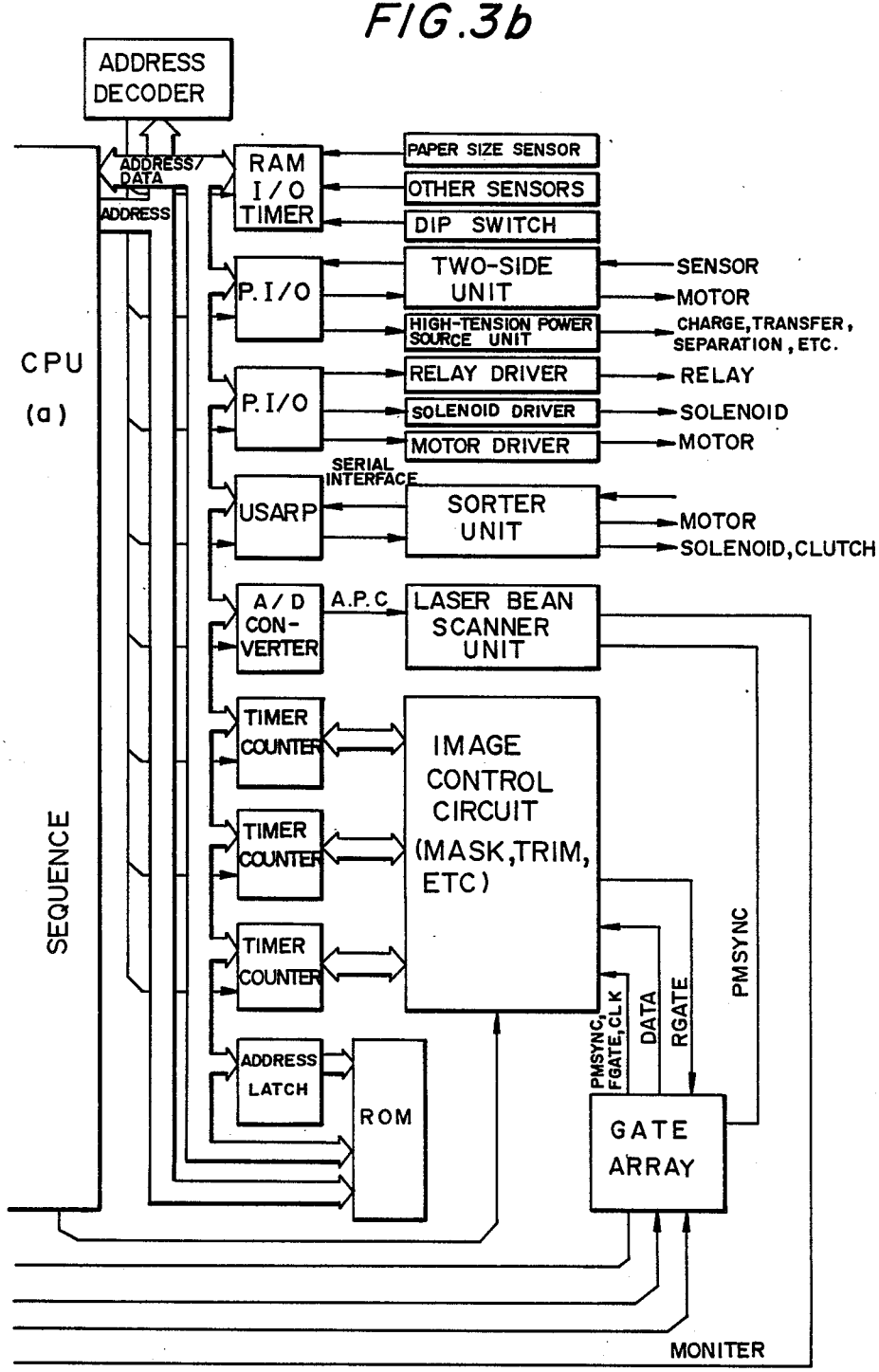

FIGS. 3a and 3b are blocks diagrams which in combination the overall construction of the copier. It is to be noted that a central processing unit CPU (a) is shown in both of FIGS. 3a and 3b to show how the two figures should be combined. A control unit of the copier includes two CPUs (a) and (b) which are assigned to sequence control and operation control, respectively. The CPUs (a) and (b) are interconnected by a serial interface (RS232C).

Sequence control which is associated with paper transport timings will be described first. Connected to the CPU (a) are a paper size sensor, sensors responsive to the discharge, register and others of a paper, the two-side unit, a high-tension power source unit, drivers associated with relays, solenoids, motors and the like, the sorter unit, the laser unit, and the scanner unit. The paper size sensor produces an electric signal by sensing the size and orientation of papers which are loaded in its associated paper cassette. Also connected to the CPU (a) are an oil end sensor, a toner end sensor, a door open sensor, a fuse sensor, etc.

The two-side unit is provided with a motor for regulating the widthwise position of papers, a paper feed clutch, a solenoid for switching a transport path, a paper presence/absence sensor, a home position sensor responsive to the position of a side fence, various sensors associated with paper transport, etc. The high-tension power source unit applies a different predetermined high-tension power to each of the charger, transfer charger, separation charger, and developing electrode. The drivers are associated with a sheet feed clutch, register clutch, counter, motor, toner supply solenoid, power relay, fixing heater, etc. The CPU (a) is connected the sorter unit by the serial interface so that papers may be transported at predetermined timings into the bins in response to a signal from the sequence. Applied to an analog input of the CPU (a) are a fixing temperature, photosensor output, laser diode condition being monitored, and laser diode reference voltage. The fixing temperature is maintained constant by on-off control in response to an output of a thermistor which is installed in the fixing section. As regards the photosensor output, a photosensor pattern produced at a predetermined timing is outputted by a phototransistor so that the CPU (a), based on the density of that pattern, couples and uncouples the toner supply clutch to control the toner density. To maintain the output power of the laser diode, an analog-to-digital (AD) converter and the analog input of the CPU are used. Specifically, the control is such that the voltage monitored when the laser diode is turned on becomes equal to a predetermined reference voltage (which is so selected as to cause the laser diode output power to be 2 milliwatts).

An image control circuit generates various timing signals associated with masking and trimming, erasure and photosensor pattern while delivering a video signal to the laser diode. A gate array functions to convert two-bit parallel image data which are outputted by the scanner into a one-bit serial signal in synchronism with a synchronizing signal PMSYNC which is generated by the scanner unit and a signal RGATE which is representative of a write start position.

The CPU (b) assigned to the operation control, or main CPU, controls a plurality of serial ports and a calendar integrated circuit (IC). Connected to the serial ports are the operating section, scanner, facsimile transceiver, interface unit and the like as well as the sequence control CPU (a). The operating section includes indicators which are individually representative of the states of keys and the conditions of the copier. While data entered on the keys are serially sent to the CPU (b), the indicators are selectively turned on by serial outputs of the CPU (b). The CPU (b) interchanges data associated with image processing and image reading with the scanner and interchanges preset data with the facsimile section and interface unit. The calendar IC stores date and time so that the copier may be turned on and off based on those data.

Figure 4:
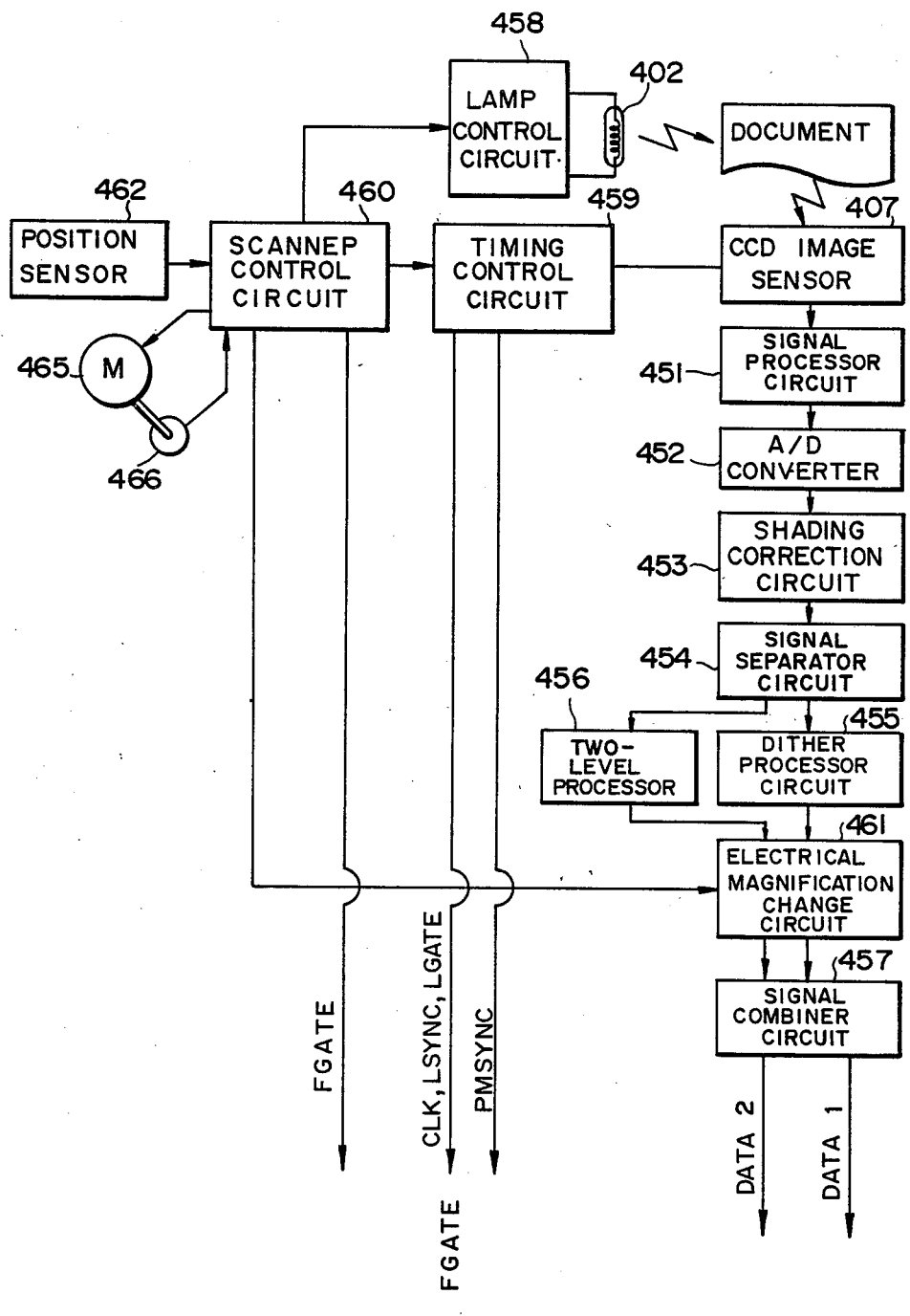
FIG. 4 is a schematic block diagram of an image scanner section.

FIG. 4 is a block diagram of the image scanner section. An analog image signal outputted by a CCD image sensor 407 is amplified by a signal processor circuit 451 and then converted by an AD converter 452 into a multi-level digital signal. This signal is routed to a shading correction circuit 453 and therefrom to a signal separator circuit 454. Processing the input image data, the signal processor circuit 454 separates characters and other two-level image components and halftone image components. While the image components are applied to a two-level processor circuit, or binarizer, 456, the halftone image components are fed to a dither processor circuit 455. Using a predetermined threshold value, the two-level processor circuit 456 converts the input multi-level data into two-level data. The dither processor circuit 455 discriminates the input data by using various threshold values which are predetermined on a scanning point basis, thereby producing two-level data including halftone data. A signal combiner circuit 457 combines the two-level signal outputted by the two-level processor circuit 456 and the two level signal outputted by the dither processor circuit 455 so as to produce signals DATA 1 and DATA 2.

A scanner control circuit 460 controls a lamp control circuit 458, a timing control circuit 459, an electrical magnification change circuit 461, and a scanner drive motor 465 in response to commands which are applied therefrom from the printer control section. The lamp control circuit 458 turns on and off the lamp 402 and controls the quantity of light, as commanded by the scanner control circuit 460. A rotary encoder 466 is connected to the output shaft of the scanner drive motor 465, and a position sensor 462 senses a reference position of a subscanning drive mechanism. The electrical magnification change circuit 461 applies electrical magnification change processing to the image data undergone dither processing and the image data undergone two-level processing, on the basis of magnification data which is set by the scanner control circuit 460 and associated with the main scanning.

The timing control circuit 459 produces various signals in response to a command from the scanner control circuit 460. Specifically, as reading begins, the timing control circuit 459 delivers to the CCD image sensor 407 a transfer signal for transferring one line of data and a shift clock adapted to deliver data one bit at a time from the shift register. The timing control circuit 459 delivers to an image reproduction control unit a pixel synchronizing clock CLK, a main scanning synchronizing clock LSYNC, and a main scanning valid period signal LGATE. The pixel synchronizing clock CLK is substantially the same as the shift clock which is applied to the CCD image sensor 407. While the main scanning synchronizing clock LSYNC is substantially the same as a main scanning synchronizing signal PMSYNC which the beam sensor of the image writing unit produces, it is inhibited from appearing when an image is not read. The main scanning valid period signal LGATE has a (logical) high level, H, when the output data DATA1 and DATA2 are considered valid. In the illustrative embodiment, the CCD image sensor 407 produces 4,800 bits of valid data per line. The data DATA1 and DATA2 are associated with odd pixels and even pixels, respectively.

The scanner control circuit 460 responds to a read start command from the printer control section by turning on the lamp 402, driving the scanner drive motor 465, and controlling the timing control circuit 459 to thereby cause the CCD image sensor 407 to start reading an image. Simultaneously, the scanner control circuit 460 turns a subscanning valid period signal FGATE to a high level. This signal FGATE becomes a low level, L, as a period of time necessary for scanning a maximum reading length (lengthwise dimension of a paper of format A in the illustrative embodiment).

Figure 9:
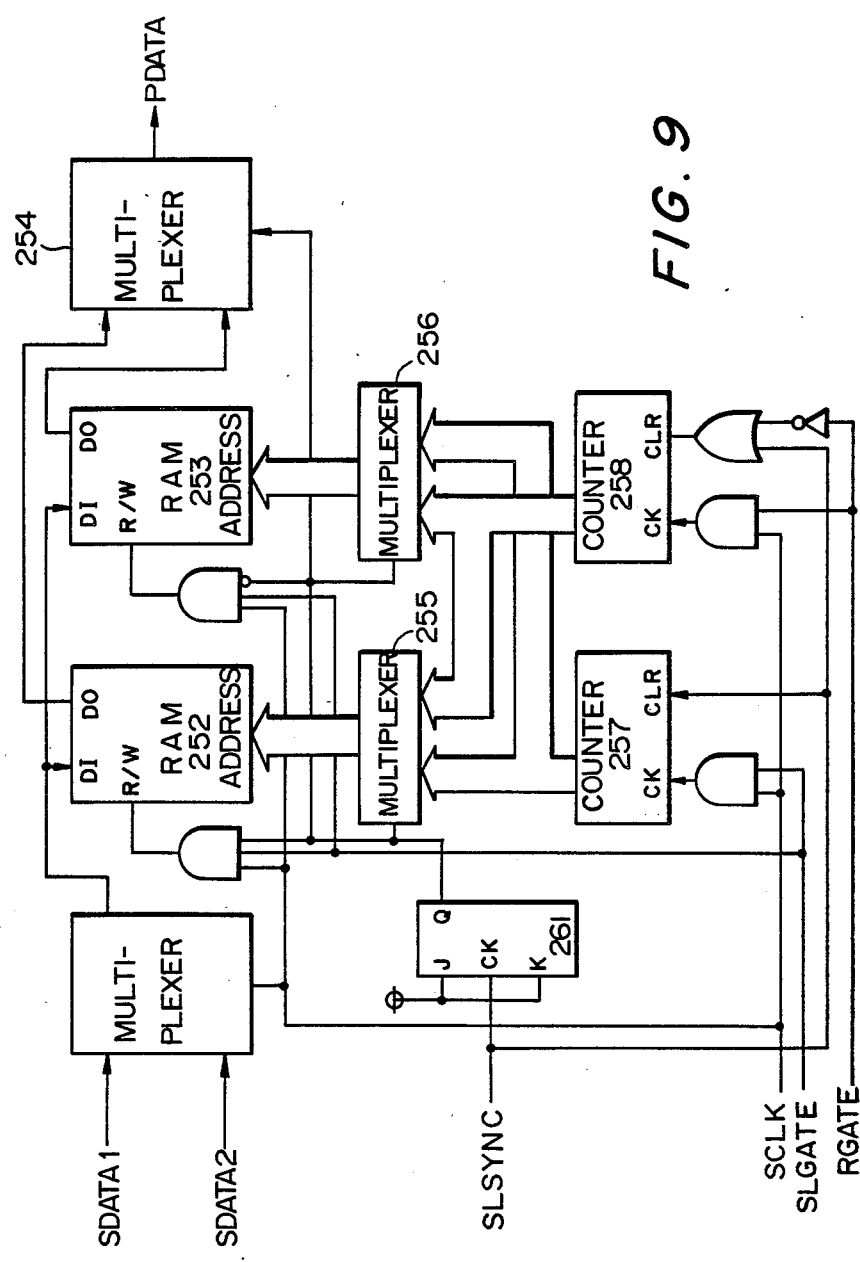
FIG. 9 is a circuit diagram showing a video board.

Referring to FIG. 9, there is shown the construction of a video board. This unit is adapted to shift in timing the image data produced by the image scanner and the image data printed out by the laser printer relative to each other in the main scanning direction. Since the image scanner and the laser printer are operated in synchronism with the same synchronizing signal PMSYNC, the above-mentioned two different kinds of image data cannot be shifted in position unless the timing at which image data appears is deviated from the main scanning synchronizing signal PMSYNC. This processing is assigned to the video board.

Figure 6:
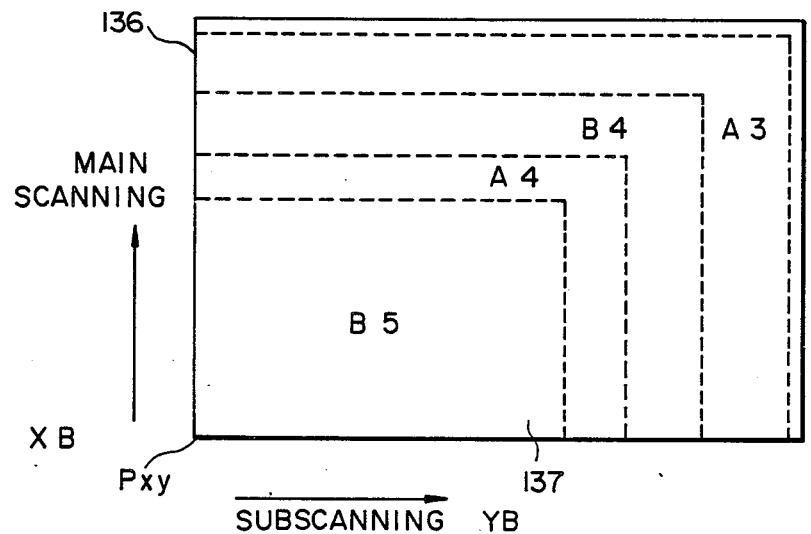
FIG. 6 is a diagram showing directions in which an original document is scanned.

The above-stated processing is indispensable for the following reason. When the size of an original document is relatively small, locating the document along the edge of a glass platen facilitates positioning of the document and, in the case of editing, it is preferable to position the document next to a scale which is located at the edge of the glass platen. Therefore, a document DOC should be located by using a point Pxy which is closest to both the main scan start position and the subscan start position as a reference with no regard to the document size, as shown in FIG. 6. In this instance, the interval between the generation of the main scanning synchronizing signal PMSYNC and the output of the first valid image data associated with the document image is constant with no regard to the document size.

Figure 5:
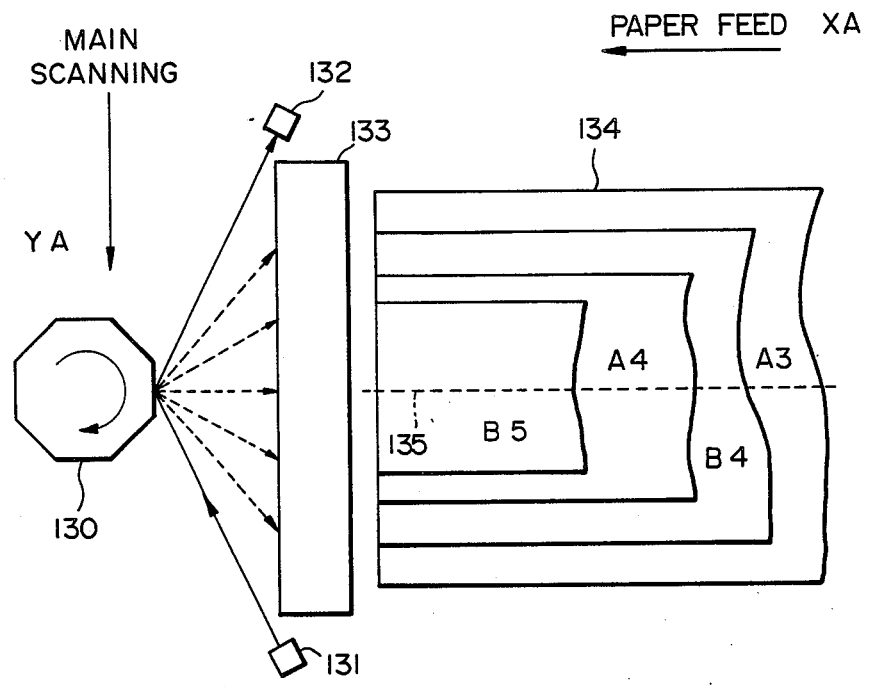
FIG. 5 is a diagram showing how a paper is fed in a laser printer.

However, as shown in FIG. 5, a paper 134 is positioned such that its center is aligned with the center of a photoconductive drum 133 with respect to the main scanning direction. It follows that the interval between the generation of the main scanning synchronizing signal PMSYNC by a synchronization sensor 132 and the arrival of the laser beam at the leading end of the paper 134 varies with the paper size. Hence, when recordings of different sizes are to be provided, the printer has to deviate the timing at which image data appears from the main scanning synchronizing signal PMSYNC. In this embodiment, therefore, the timing of image data is changed depending upon the size of a paper, as described in detail later.

Specifically, one line of image data are temporarily stored in a RAM and the write timing and read timing are changed to shift the above-mentioned timings relative to each other. As shown in FIG. 9, the circuitry includes two RAMs 252 and 253 which store one line of image data each and are provided in a pair. While one of the RAMs 252 and 253 is in a write mode, the other is in a read mode. The RAMs 252 and 253 are each controlled such that reading and writing alternate with each other on a line-by-line basis. An address bus is switched by multiplexers 255 and 256 while a data bus is switched by a multiplexer 254. A switching signal is generated by a flip-flop 261 whose state is inverted every time the main scanning synchronizing signal appears.

Addresses for writing data in the RAMs 252 and 253 are generated by a counter 257. The counter 257 is reset to zero by a main scanning synchronizing signal PLSYNC and starts counting clock pulses CLK which appear in synchronism with the pixels of input image data. Hence, a value associated with the pixel position of instantaneous data with respect to the main scanning position appears on the output terminal of the counter 257. However, it is only when the main scanning valid term signal SLGATE has a high level, i.e., when the image scanner produces valid image data that the counter 257 actually counts the clock pulses CLK.

Figure 8:
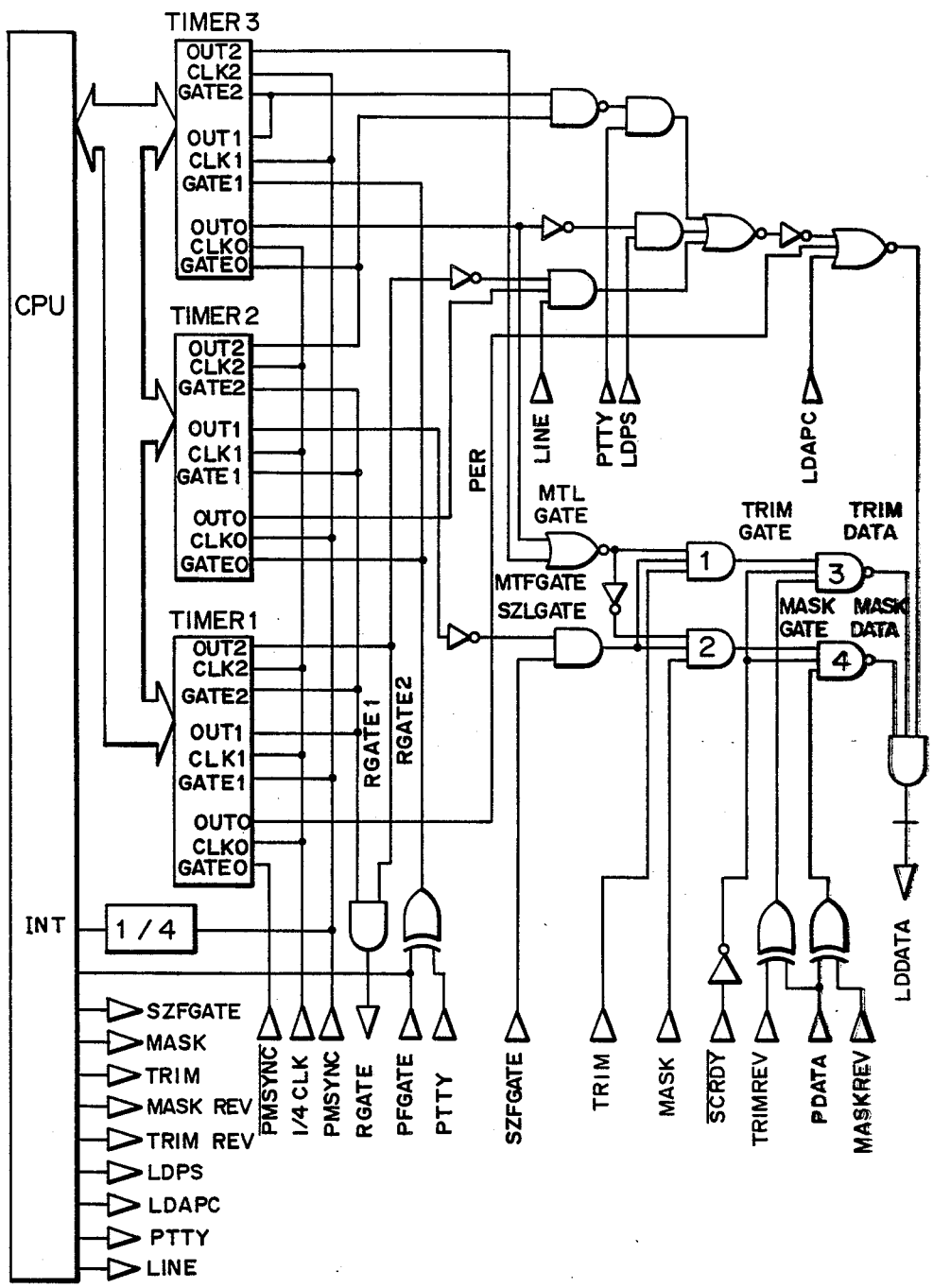
FIG. 8 is a circuit diagram representative of a video processing section of a control board.

Read addresses of the RAMs 252 and 253 are generated by a counter 258. This counter 258 is reset to zero by the main scanning synchronizing signal PLSYNC or when a read valid term signal RGATE is off and starts counting the clock pulses CLK which appear in synchronism with the pixels of input video data. Again, it is only when the signal RGATE has a high level that the counter 258 actually counts the clock pulses CLK. This signal RGATE is generated by a counter 1 which is built in an integrated circuit (IC) timer 1 which is shown in FIG. 8, and it goes positively later than the synchronizing signal PMSYNC by a period of time which is associated with a value set in the counter 1.

Therefore, considering the main scanning synchronizing signal PMSYNC as a reference, the data write timing and the data read timing with the RAM 252 and 253 are deviated from each other by a period of time which corresponds to the difference between the positive going edge of the signal SLGATE and that of the signal RGATE. This time lag is effective in adjusting an image data output timing, i.e. an image recording position. Image data read out of the RAM 252 or 253 are applied to one input terminal of an OR gate 264 via a multiplexer 254. Applied to the input terminal of the control board is an image signal PDATA which is outputted by the multiplexer 254.

Figure 11:
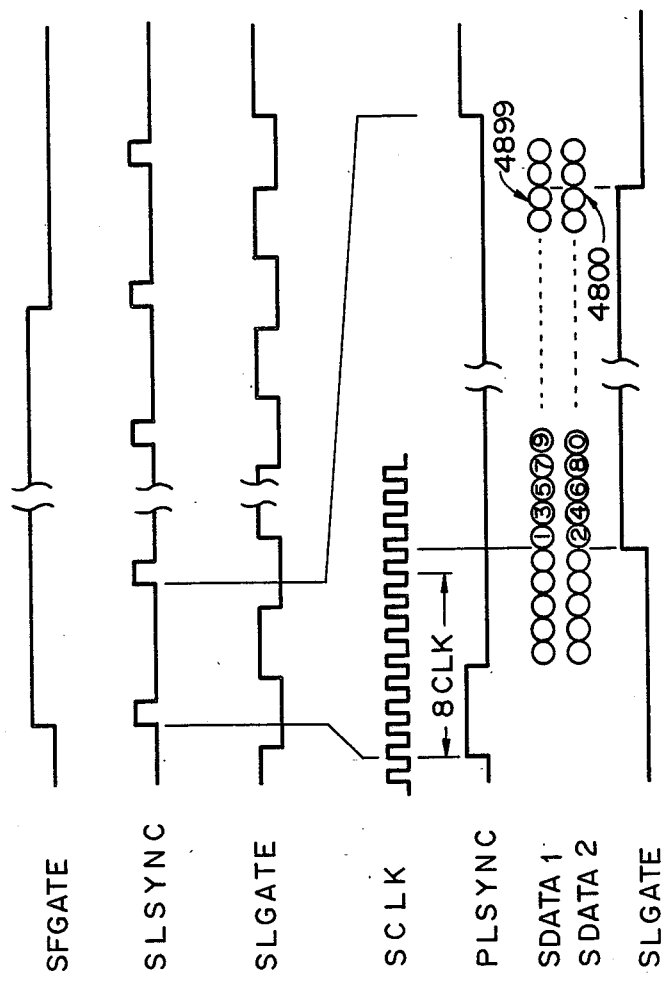
FIGS. 11 to 18 are timing charts each demonstrating an image forming procedure.

Referring to FIG. 11, there is shown a timing chart representative of a video signal which is fed from the scanner section to the printer section. A signal SFGATE is indicative of an effective subscanning width of the video signal while serving as a subscanning synchronizing signal. Specifically, when a paper is brought into a waiting condition at a register roller, the printer section feeds a SFGATE request signal to the scanner section. In response, the scanner section returns a SFGATE signal to the printer section at a predetermined timing. Based on a positive going edge of the SFGATE signal, the printer section determines a timing for rotating the register roller. A signal PLSYNC is a main scanning synchronizing signal for causing the scanner to feed a video signal. This signal PLSYNC is derived from the laser beam which is reflected by the polygon mirror to be sensed by a sensor which is located at the main scanning start point of the drum (PMSYNC signal). Hence, the main scanning start point on the drum and the write point of data which is fed from the scanner section coincide with each other, so that an image is accurately formed on the drum. A signal SLGATE is representative of a main scanning data valid term signal. In the illustrative embodiment, the scanner section reads data at a rate of 400 dpi, 4,800 data at maximum are assumed to be valid in the lateral direction of format A3 (297/ 25.4×400=4677. Therefore, even when the format is smaller than A3, 4,800 data are outputted as valid data in the main scanning direction. SDATA 1 and 2 are the processed version of those data which have been read by the CCD. A clock SCLK is adapted for data synchronization, and data are fed from the scanner section timed to this clock SCLK.

Figure 7:
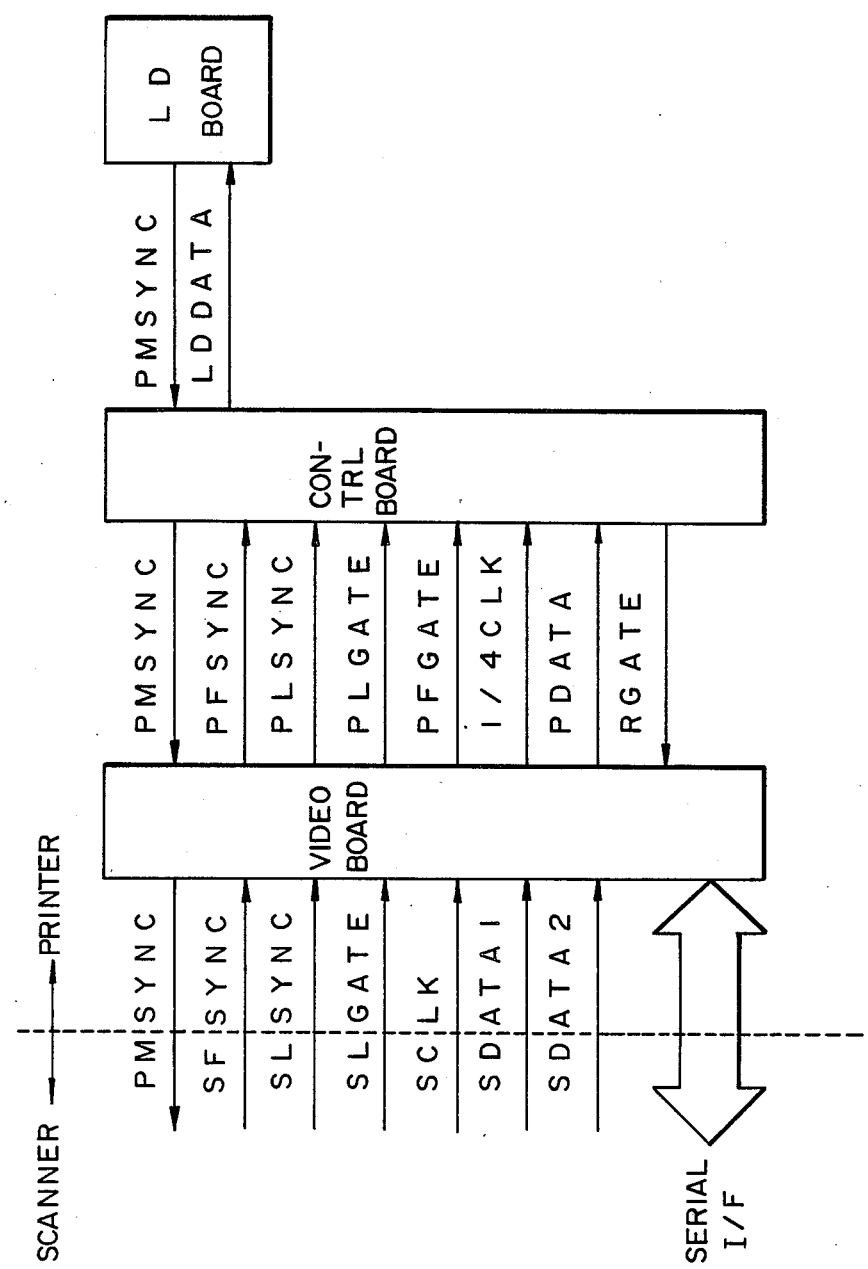
FIG. 7 is a schematic block diagram showing the flow of a video signal in the printer.

FIG. 7 shows the flow of a video signal in the printer. In accordance with the present invention, the printer section includes a control board for controlling the flow of a paper, a video board for producing PDATA by synchronizing a video signal to the drum (PDATA being a compositive signal of DATA1 and DATA2), and an LD board for turning the LD on and off.

Referring to FIG. 8, a circuit representative of a video processing section of the control board is shown.

Timers 1, 2 and 3 are each implemented by a programable interval timer 8253. These timers 1, 2 and 3 serve seven different functions:

(1) producing a data output timing generating signal associated with the main scanning direction;
(2) producing image data which match with a particular paper size;
(3) masking and trimming image data;
(4) producing a vertical and a horizontal test pattern;
(5) preparing a P-sensor pattern;
(6) multi-copy; and
(7) generating a synchronizing signal.

The seven different functions mentioned above will be sequentially described in detail.

Figure 12:
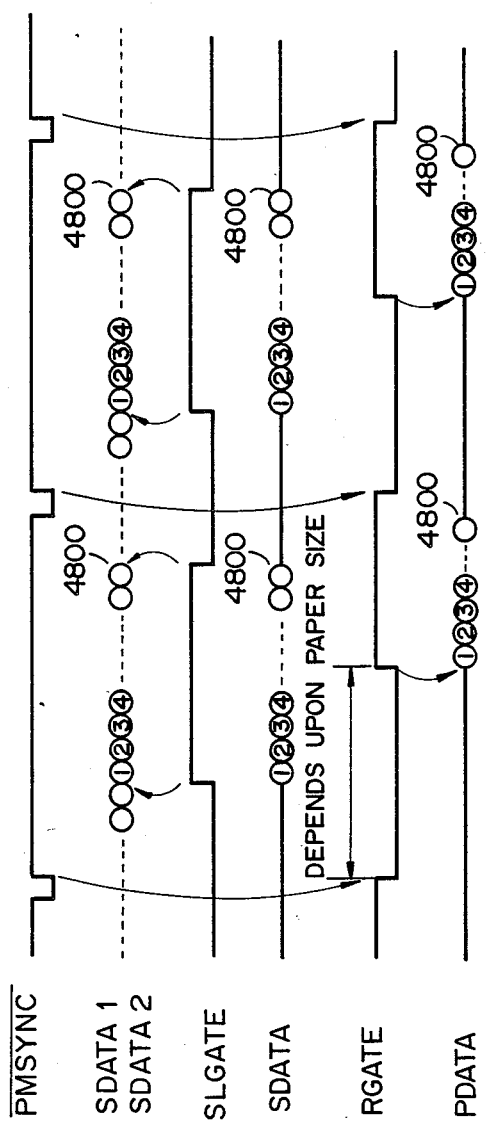
Figure 19:
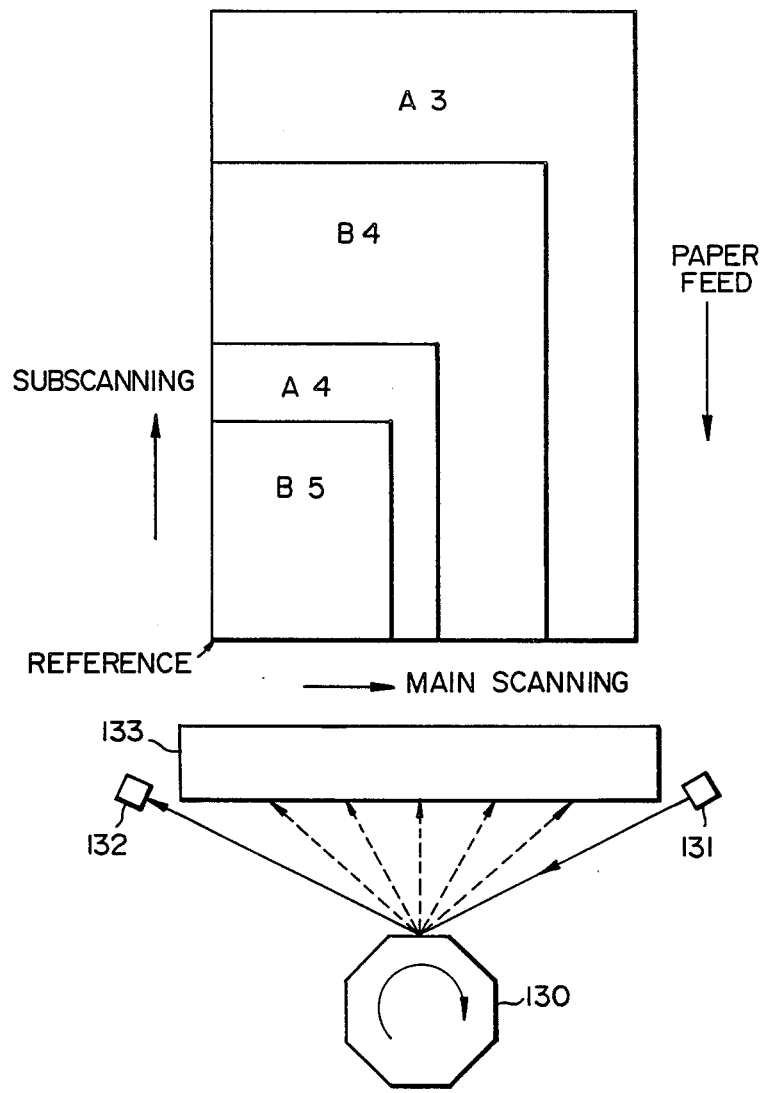
FIGS. 19 and 20 are diagrams showing the positions of papers of various sizes in the laser printer.
Figure 20:
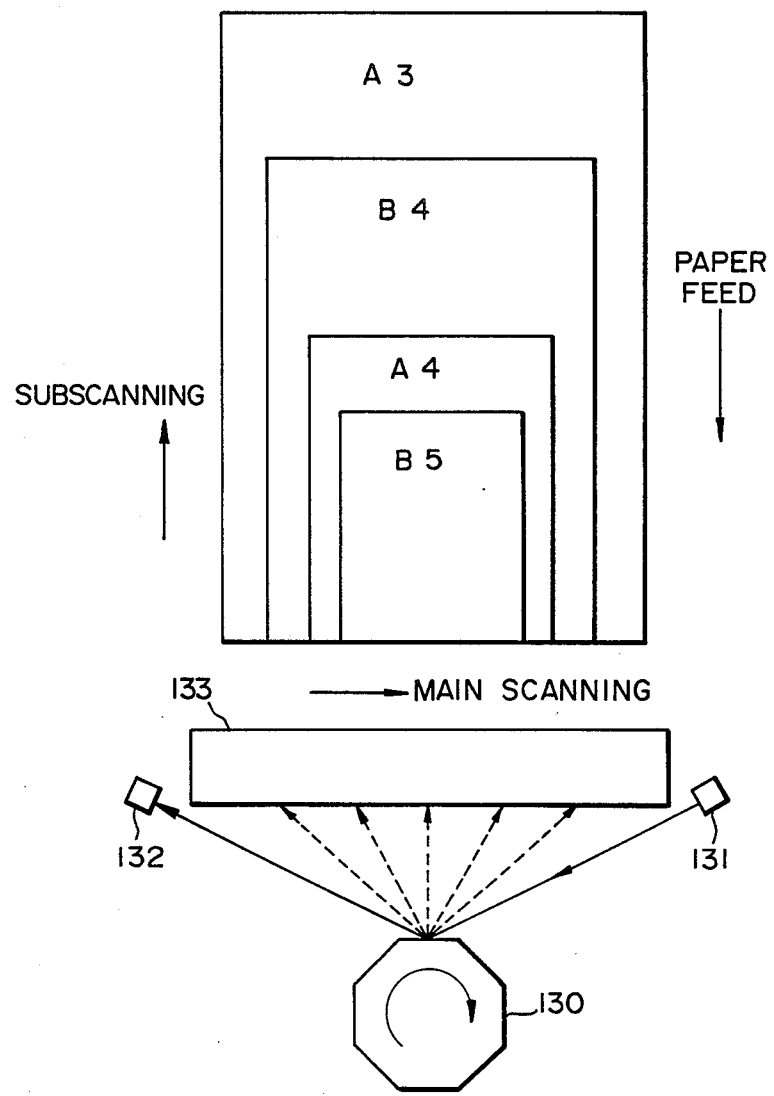

(1) The data output timing generating signal associated in the main scanning direction is generated by using the counter 1 of the timer 1. This signal is used when the paper feed reference of the printer varies with the paper size. In FIG. 19, paper feed occurs on one side (PMSYNC sensor side) and the same reference point in the main scanning direction is shared by different paper sizes. Hence, all that is required is determining the interval between the PMSYNC signal and the leading end (reference point) of an image once. However, when paper feed occurs at the center as shown in FIG. 20, the reference point differs from one paper size to another and, therefore, the timing at which data are written on the drum by the laser beam has to be changed on a paper size basis. Such a timing is shown in FIG. 12. The counter 1 is used in a mode 1. PMSYNC is applied to GATE1 while 2/4 CLK is applied to CLK0, because a programable interval timer 8253 is operable only up to 2 MHz (the current CLK has a frequency of 8 MHz). When PMSYNC is applied to GATE, the output becomes low and, when a predetermined number of clocks (when a paper size is determined, clocks the number of which is associated with the size is loaded in the counter 1) becomes high to serve as a signal GATE. In the video board, SDATA1 and SDATA2 are fed to a 1-line buffer in synchronism with SCLK, PDATA being outputted timed to the positive going edges of the signal RGATE. In another possible arrangement, the counter 1 is used to effect a shift in the subscanning direction, and a counter is provided which is applied with PFGATE at its GATE and PMSYNC at its CLK. This allows an image to be moved in the subscanning direction to any desired position on a copy by the same procedure as stated above.

Figure 10:
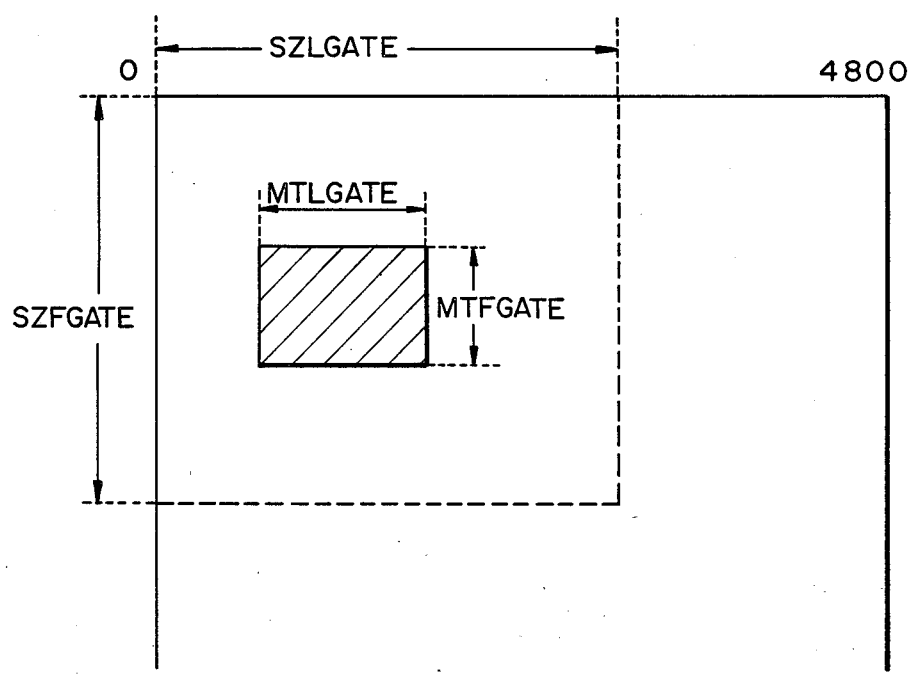
FIG. 10 is a diagram for explaining how a non-transferred portion is produced.
Figure 21:
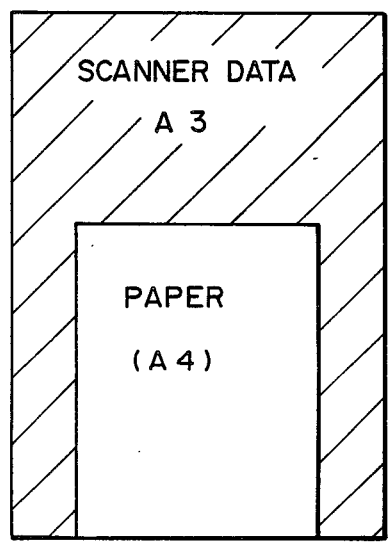
FIG. 21 is a diagram showing a non-transferred portion.

(2) Image data matching with the paper size are produced when the data size of an image which is fed from the scanner is relatively large (e.g. when the paper size is A4 and the data size is A3). Assuming that the data from the scanner are of A3 size and that an A4 paper is fed in a vertically long position, an image provided on the drum is partly left non-transferred to the paper (as indicated by hatching in FIG. 21). This not only aggravates the fatigue of the drum but also causes toner in the hatched area to be simply wasted. To eliminate this shortcoming, use is made of SZLGATE (GATE signal matching with the paper size in the main scanning direction) and SZFGATE (GATE signal matching the paper size in the subscanning direction) as shown in FIG. 10.

Figure 22:
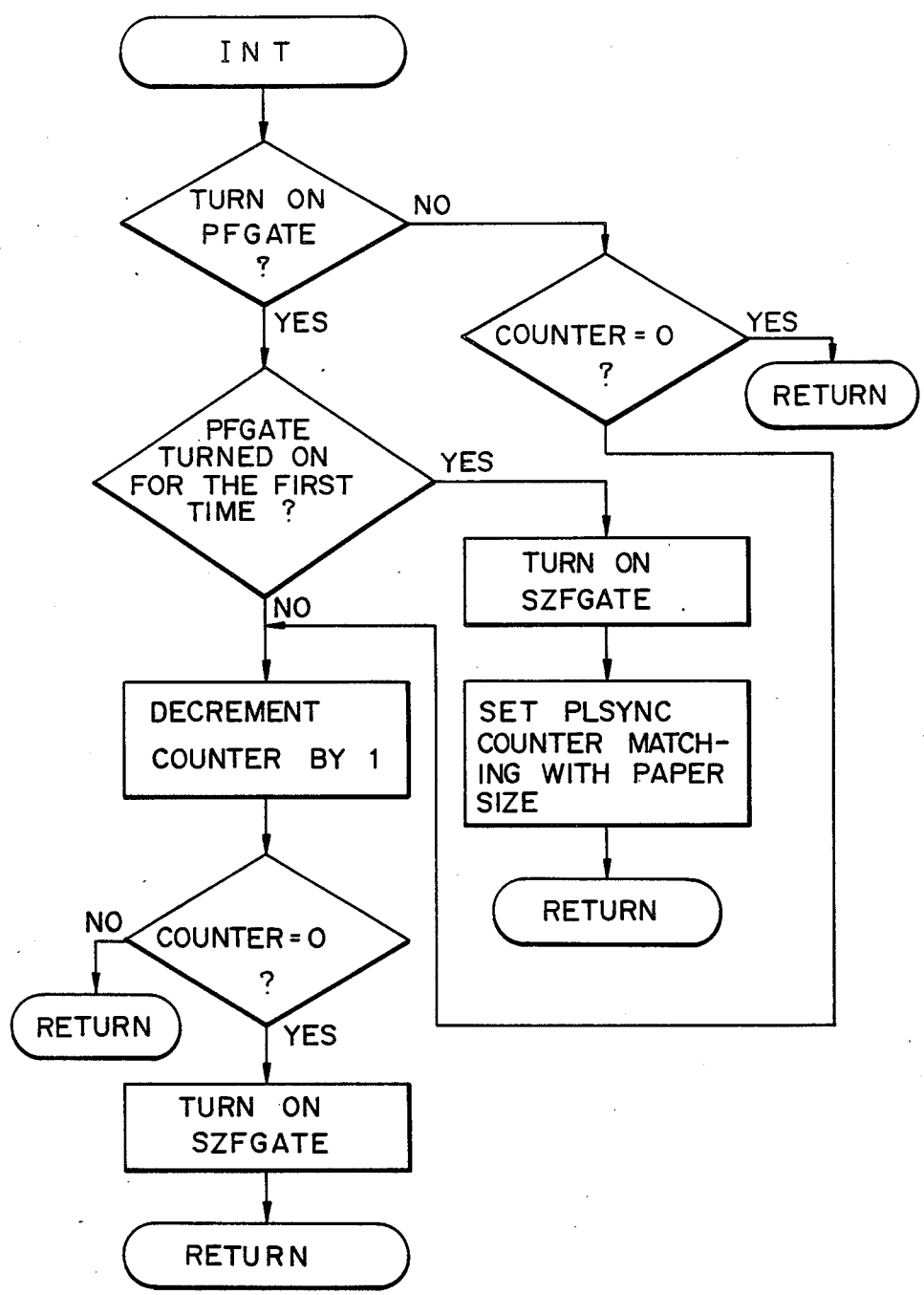
FIG. 22 is a flowchart representative of an interrupt routine.

(i) SZFGATE is produced by applying the PLSYNC signal to an interrupt terminal of the CPU. An interrupt routine is shown in FIG. 22. As shown, when the PLSYNC signal is fed to the CPU, the CPU sees if PFGATE is high and, if PFGATE has been turned on for the first time, makes SZFGATE high to set a counter which matchs with the paper size. When the counter is reset to zero, the CPU makes the SZFGATE low.

Figure 13:
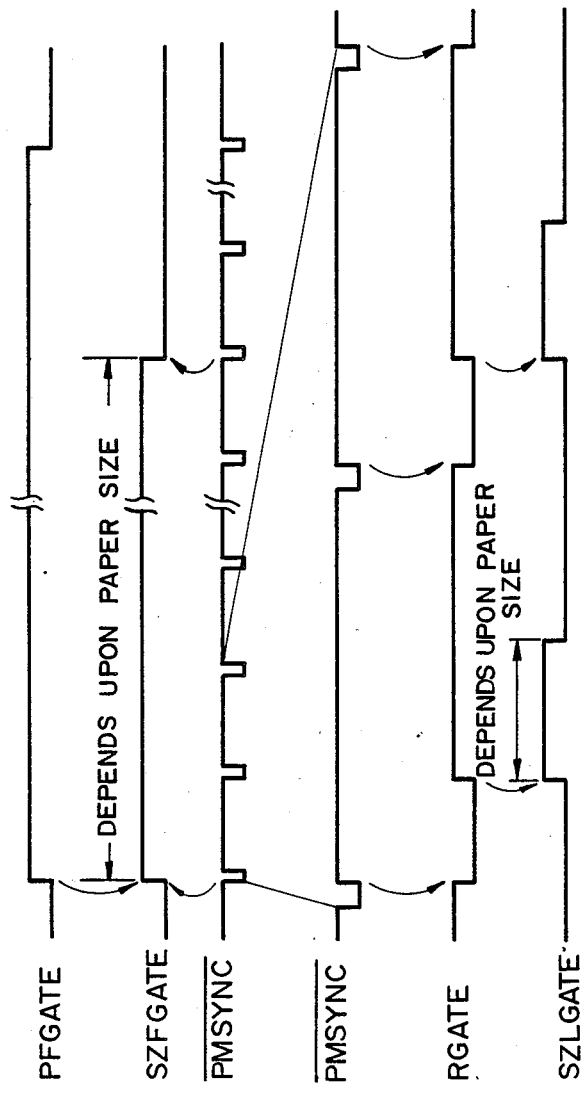
Figure 14:
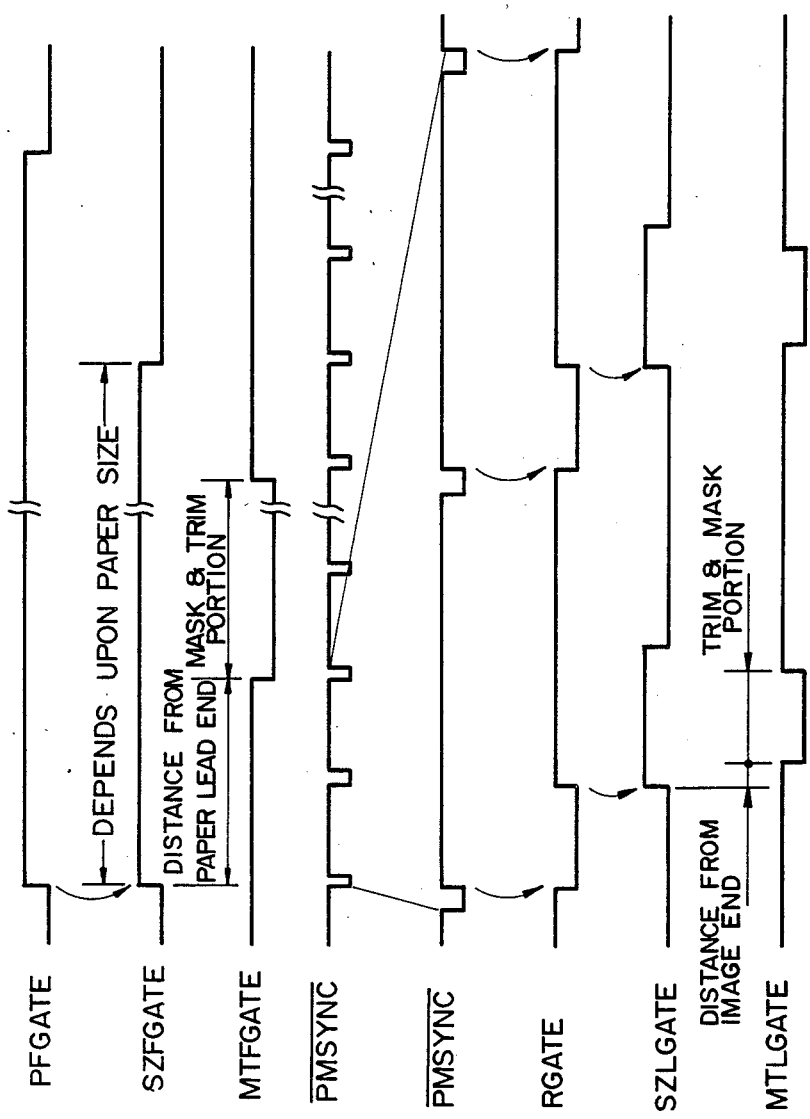

(ii) SZLGATE is used in the mode 1 by using the counter 1 of the timer 2. RGATE is applied to GATE1 while ¼CLOCK is applied to CLK1. When RGATE is applied to GATE, SZLGATE becomes high (because a signal routed through an inverter serves as SZLGATE although OUT1 of the counter 1 is low) and it becomes low after a predetermined number (when a paper size is determined, the number of clocks in the main scanning direction is loaded in the counter 1) of clock pulses have been counted. These SZFGATE and SZLGATE are ANDed to produce an image which matches with the paper size. This is shown in a timing chart in FIG. 13.

(3) As regards the masking and trimming of image data, the counter 2 of the timer 2 and the counter 1 of the timer 3 are used to determine the position in the main scanning direction while the counters 1 and 2 of the timer 3 are used to determine the position in the subscanning direction.

(i) MTLGATE is generated by using the counter 2 of the timer 2 and the counter 0 of the timer 3 in the mode 1. PLGATE is applied to GATE2 of the counter 2 while ¼CLK is applied to CLK2. As the PLGATE signal is applied to GATE2, an OUT2 signal becomes low and, when a predetermined number (the number of clock pulses associated with the distance between the end of an image and a portion to be masked or trimmed is loaded in the counter 2) are counted, becomes high. Applied to GATE1 of the timer 3, OUT2 makes OUT0 low as its positive going edge, this low OUT0 serving as the MTLGATE signal. CLK0 is implemented by ¼CLK. MTLGATE becomes high when a predetermined number (the number of clocks associated with the width of an image region to be masked or trimmed is loaded in the counter 0) are counted.

(ii) MTFGATE uses the counters 1 and 2 of the timer 3 in the mode 1. PMSYNC is applied to both of CLK1 and CLK2. When PFGATE applied to GATE1 goes positively, the OUT1 signal becomes low and, when a predetermined number (the number of clock pulses associated with the distance between the end of an image and a portion to be masked or trimmed is loaded in the counter 1) are counted, becomes high. This OUT1 is fed to GATE2. As OUT1 goes positively, OUT2 becomes low to serve as the MTFGATE signal. When a predetermined number (the number of clocks associated with the width of an image region to be masked or trimmed is loaded in the counter 2) are counted, MTFGATE becomes high. The AND of these MTLGATE and MTFGATE and the GATE and MASK signals associated with the paper size as described in (2) are used to designate the region outside the marked region (see FIG. 26 (a)). Also, an inverted version of the AND of MTLGATE and MTFGATE and the GATE and TRIM signals associated with the paper size are used to designate the inside of the marked region (see FIG. 26 (b)).

The image signal PDATA is applied to XEOR. When TRIMREV or MASKREV is low, the signal PDATA is directly outputted and, when it is high, the signal PDATA is inverted before it is outputted. The AND of PDATA and the signals which designate respectively the inside and the outside of a marked region derives combinations shown below (a signal SCRDY is a clock signal showing that the polygon motor reachs a constant speed, and data are not outputted unless the polygon motor reaches the constant speed. Should the laser diode be turned on when the polygon motor was in a halt, the laser beam would illuminate only a limited sport on the drum to thereby cause the drum to fatigue only locally. This signal is usually maintained high until the polygon motor becomes locked (about 2 to 3 seconds) when the power switch is turned on and, thereafter, becomes low to allow data to be outputted):

a. outputting data of a marked region
b. outputting reversed data of a marked region
c. outputting data of the outside of a marked region
d. outputting reversed of a marked region;
e. outputting reversed data of a marked region and data of the outside of the marked region
f. outputting data of a marked region and reversed data of the outside. of the same.

Figure 15:
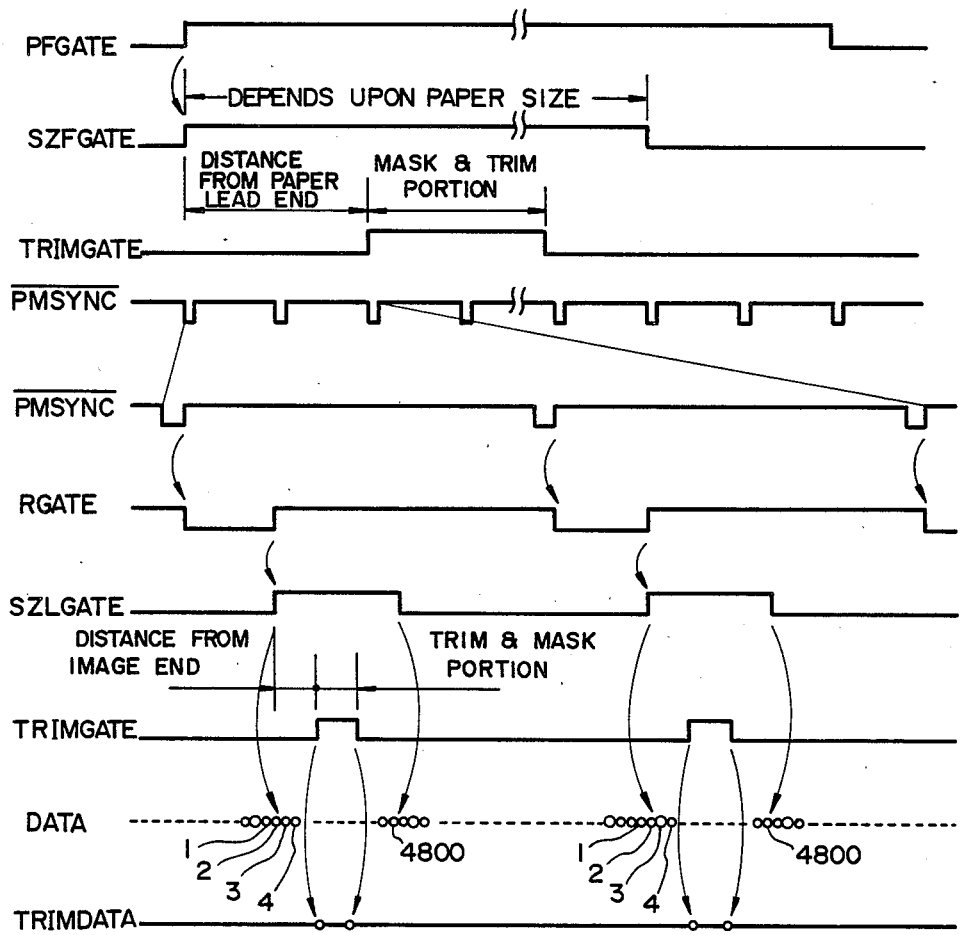

(a) outputting data of a marked region
MASK—low
TRIM—high
MASK REV—don't care
TRIM REV—low In the above condition, AND1 produces an output which marks a particular region. The AND of this signal and the data is outputted by AND3. Sine MASK is low, the output of AND2 is low and so is the output of AND4 (see FIGS. 15 and 27 (a)).

Figure 16:
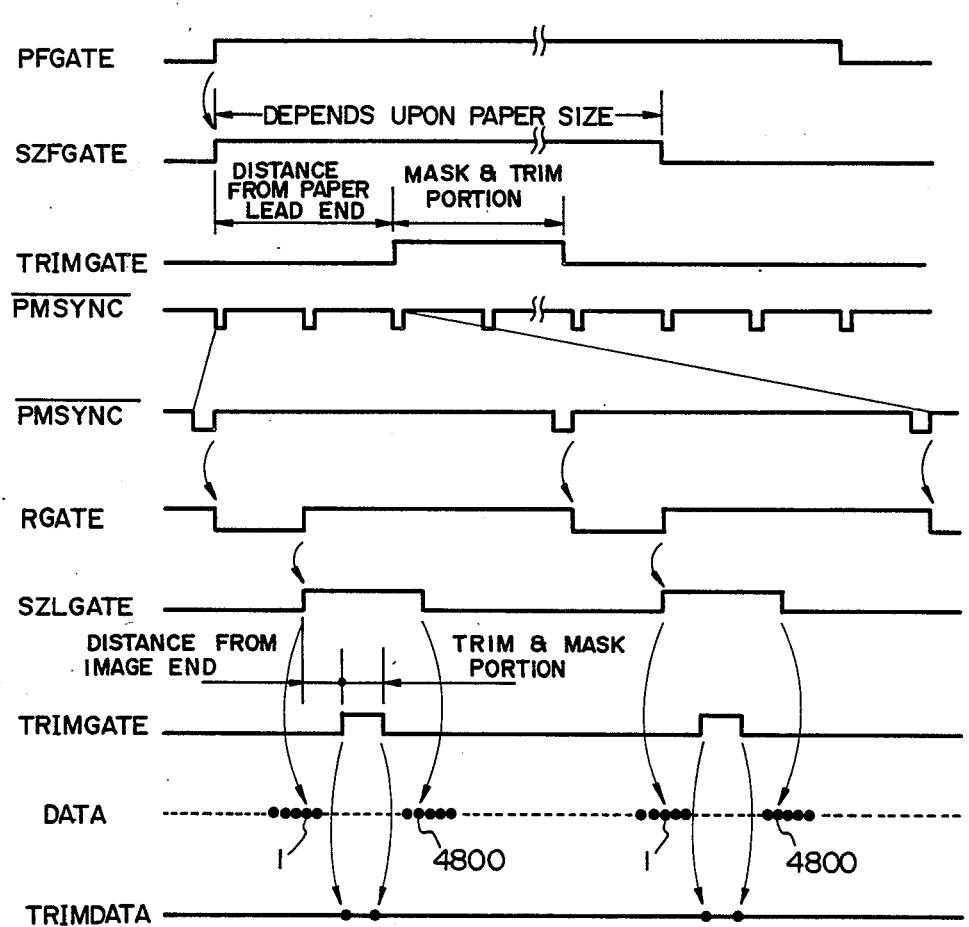

(b) Outputting reversed data of marked region
MASK—low
TRIM—high
MASK REV—don't care
TRIM REV—high This condition is different from the previous condition (a) in that TRIM REV is made high to invert the data within the marked region (see FIGS. 16 and 27 (b)).

Figure 17:
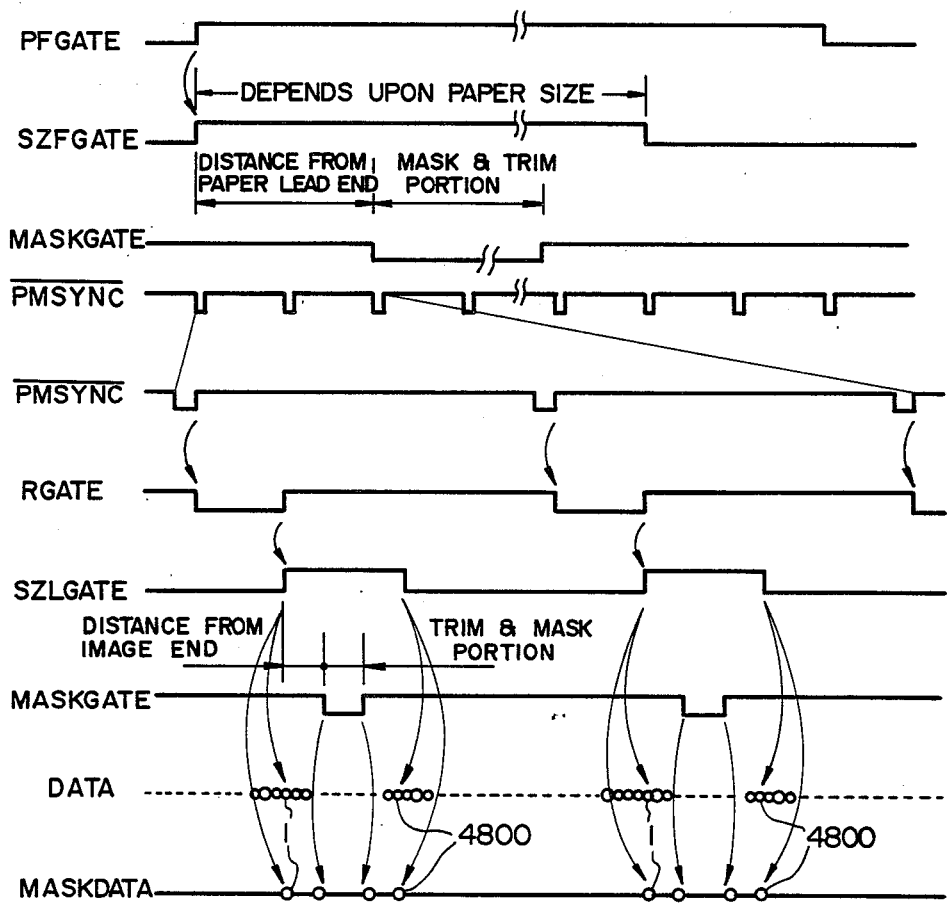
Figure 18:
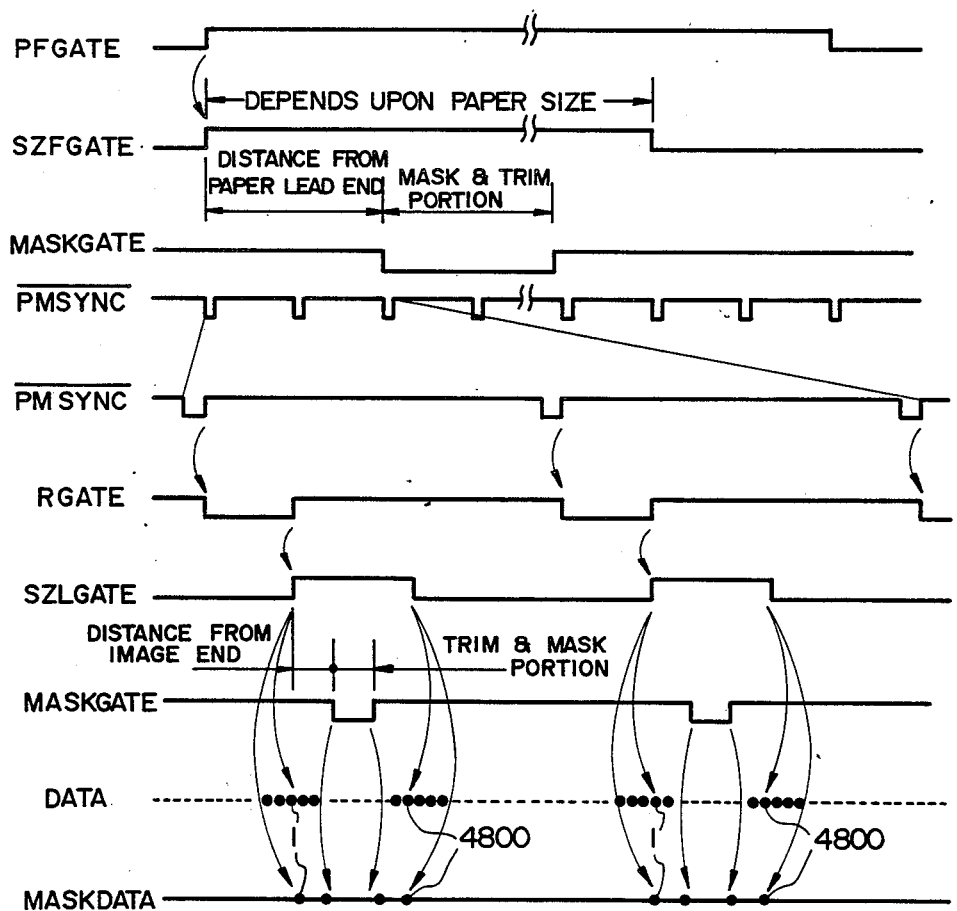

(c) Outputting data of outside of marked region
MASK—high
TRIM—low
MASK REV—low
TRIM REV—don't care In this condition, the output of AND2 marks a particular region. This signal and the data are ANDed by AND4. Since TRIM is low, the output of AND1 and therefore the output of AND3 is low (see FIGS. 17 and 27 (c)).

(d) Outputting reversed data of masked region
MASK—high
TRIM—low
MASK REV—high
TRIM REV—don't care This condition differs from the condition (c) in that MASK REV is made high to reverse the data of the outside of the masked region (see FIGS. 19 and 27 (d)).

(e) Outputting reversed data of marker region and data of outside of the same
MASK—high
TRIM—high
MASK REV—low
TRIM REV—high This is the combination of the cases (b) and (c) (see FIG. 27 (e)).

(f) outputting data of marked region and reversed data of outside of the same
MASK—high
TRIM—high
MASK REV—high
TRIM REV—low This is the combination of the cases (a) and (d) (see FIG. 27 (f)).

(4) Producing vertical and horizontal test patterns

A vertical and a horizontal test pattern are individually generated by using the timers assigned to masking and trimming.

A vertical test pattern is produced by using the timer which is adapted to produce MTLGATE. Specifically, when the counter 2 of the timer 2 is used in a mode 2, OUT 2 shown in FIG. 23 (a) is obtained; when it is used in a mode 3, OUT 2 shown in FIG. 23 (b) is obtained.

(ii) A horizontal test pattern is generated by using the timer adapted to produce MTFGATE (counter 1 of timer 3). Either the pattern shown in FIG. 23 (c) or the pattern shown in FIG. 23 (d) is attainable. Whether or not to generate a pattern is determined by a vertical/-horizontal pattern signal (PTTY) which is fed from the CPU. When this signal is on, a vertical and a horizontal pattern are generated at the same time. Specifically, this pattern signal is not related to PDATA, and a signal for turning on and off the laser is applied to the LD board. This allows a test pattern to be freely printed out in either direction. In the event that any trouble associated with an image such as a shift or moire has occured, whether the trouble is ascribable to the data fed from the scanner or to the writing system of the printer can be immediately decided.

(5) A P-sensor pattern is produced by using the data which are adapted for trimming and masking. A P-sensor pattern is an image which is provided on the drum to be sensed by a P-sensor for sensing toner content. Generally, in an analog copier, a P-sensor pattern is located in a position which a scanner scans immediately after the start of its scanning stroke (before a document) and is read by optics to be focused on a drum. In a digital copier, however, the data input to a printer is not fed always from a scanner and may be fed from a word processor, personal computer or facsimile terminal. In such a case, too, density control with a P-sensor is needed.

In accordance with the present invention, a P-sensor pattern is provided at the trailing end of an image. Here, the words "trailing end of an image" should be understood to refer to the trailing end of a paper size of the printer and not the trailing end of an image which may be fed from the scanner, word processor, personal computer or the like. Assume that the paper size of the printer is greater than the size of data, as shown in FIG. 25 (a). Then, the pattern overlaps with the trailing end of the image and printed out on every tenth copy (because the P-sensor pattern is produced one for ten copies to sense image density) (see FIG. 25 (b). It follows that the P-sensor pattern has to be provided at the trailing end of a paper. When the data size is greater than the paper size as shown in FIG. 24 (a), the P-sensor pattern should be located at the trailing end of the data, as shown in FIG. 24 (b).

Figure 24:
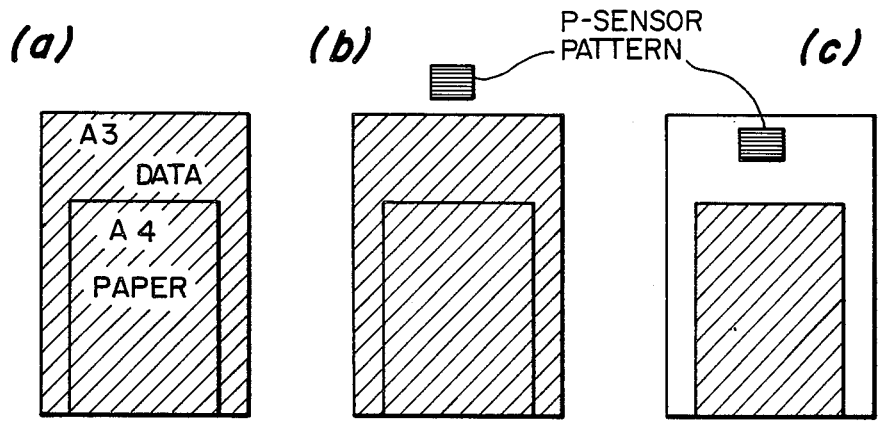
FIGS. 24 and 25 are diagrams each showing a received image.
Figure 25:
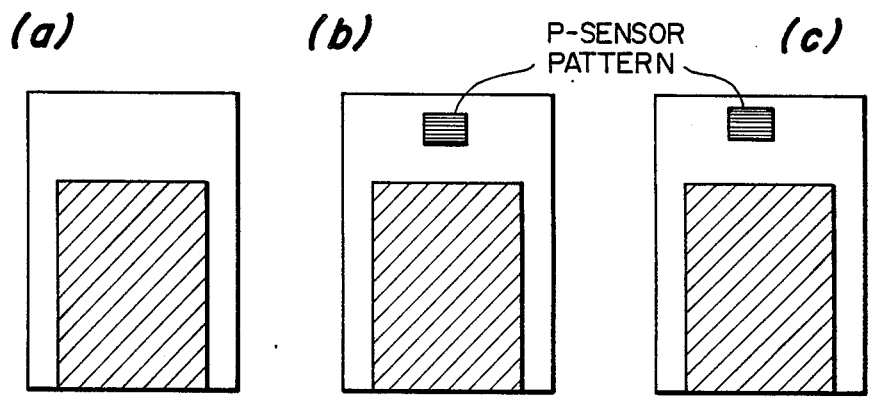

While the P-sensor pattern may be provided at the rear end of one of the paper size and data size which is greater than the other, it should be provided at the trailing end of the paper size as shown in FIG. 24 (c) or 25 (c) partly because the data size from a word processor, personal computer, facsimile terminal or the like is often irregular and therefore needs complicated control and partly because the range available for copying is determined solely by the paper size. In more detail, data other than the paper size are cut off by using the method of producing image data which match with a copy size as discussed in (2). Then, upon the lapse of a predetermined period of time (during which PLSYNC pulses fed to INT of the CPU are counted) after the turn-on of SZFGATE as shown in FIG. 22, the P-sensor position with respect to the main scanning direction is determined by MTLGATE of the method of masking and trimming image data as discussed in (3) while, at the same time, the P-sensor position with respect to the subscanning direction is determined by the LDPS signal (set by the CPU). This allows the P-sensor pattern to be produced at a predetermined position of the trailing end of an image.

(6) Multi-copy

Figure 28:
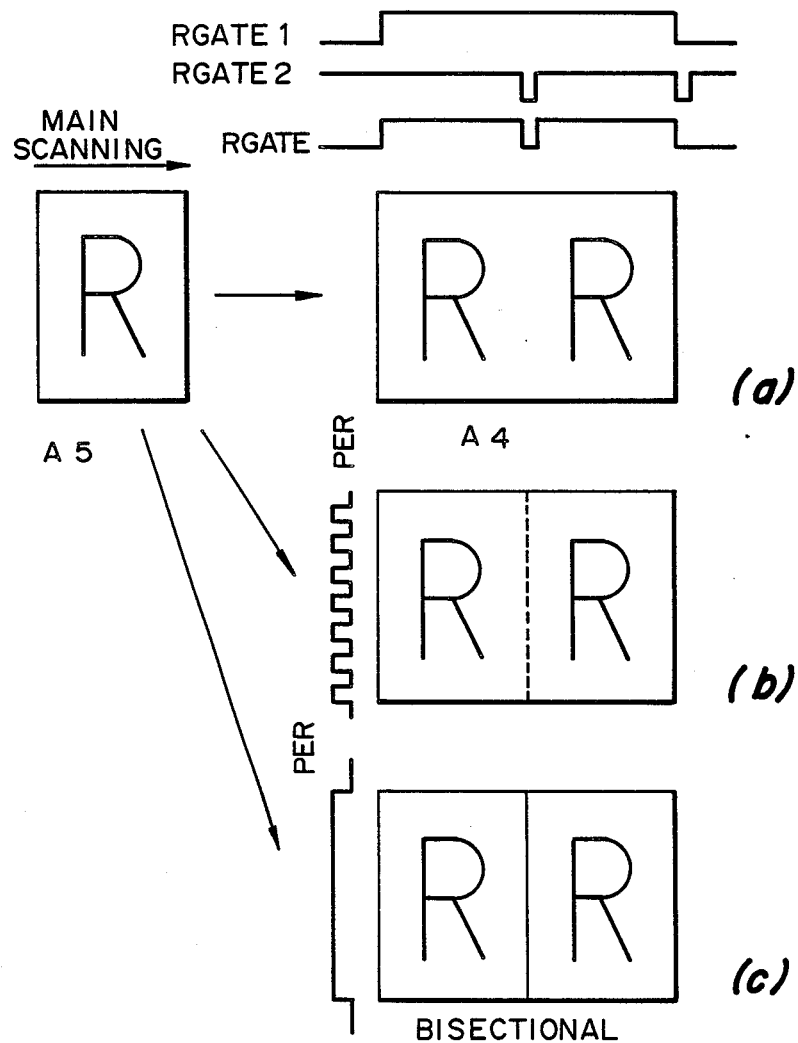
FIG. 28 is a diagram for explaining a multi-copy procedure.

This is a mode for repetitively outputting data in the main scanning direction several consecutive times. FIG. 28 shows by way of example a case wherein image data of A5 size are printed out on a paper of A4 size. In this case, the RGATE1 signal appearing on OUT 1 of the timer 1 as discussed in (1) is fed to GATE2 of the timer 1. This timer 1 is operated in the mode 2. ¼CLK is applied to CLK2. When RGATE1 goes positively, it is made low for one pulse after a predetermined number (the number of clock pulses associated with one half of the paper size is loaded in the counter 2) of clock pulses have been counted. This signal clears the counter 258 of FIG. 9 so that addresses 0 and onward are generated again, whereby the same image is read out of the RAM 253.

By using the RGATE2 signal which appears on OUT2 of the timer 1, it is possible to provide a phantom line or a solid line at the center of the paper, as shown in FIGS. 28 (b) and 28 (c). This is implemented with a counter 0 of the timer 2. Specifically, as shown in FIG. 28 (a), nothing is produced when the line signal is made low. Assume that the line signal is made high, that PFGATE is fed to GATE0 of the timer 2 and PMSYNC to CLK0, and that the mode 3 is used. Then, when the number of clock pulses associated with a desired phantom line is loaded in the counter 0, PER is produced from the OUT0. This PER and the output of RGATE2 and ANDed to produce a phantom line only for one clock pulse at the negative-going edge of RGATE2. Such a condition is shown in FIG. 28 (b). Further, when the number of clocks greater than the width of the paper is loaded in the counter 0, the PER signal becomes high with the result that a solid line is produced only for one clock at the negative-going edge of RGATE2, as shown in FIG. 28 (c).

Figure 30:
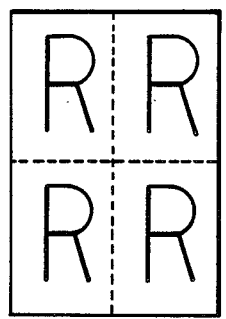
FIGS. 29 and 30 are diagrams each showing a quadruple multi-copy procedure.
Figure 29:
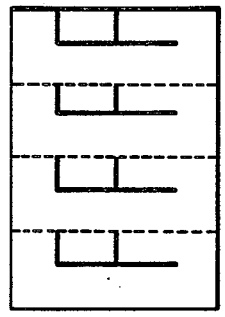

While the multi-copy system has been shown and described in relation to the bisection of a paper, even a quadruple copy shown in FIG. 29 or the like may be freely produced merely by changing the number of clocks which is loaded in the counter 2 of the timer 1. The bisected copy (FIG. 28 (b)) may be reduced and subjected to bisectional copy so as to print out four identical data on a paper of A4 size, as shown in FIG. 30. Such a procedure may be repeated to print out eight, sixteen, thirty-two and like identical data on a single paper.

(7) Producing synchronizing signal

Figure 31:
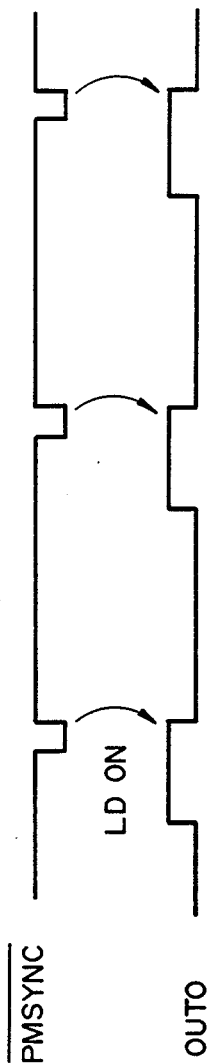
FIG. 31 is a timing chart showing the timing for turning on a laser diode.
Figure 32:
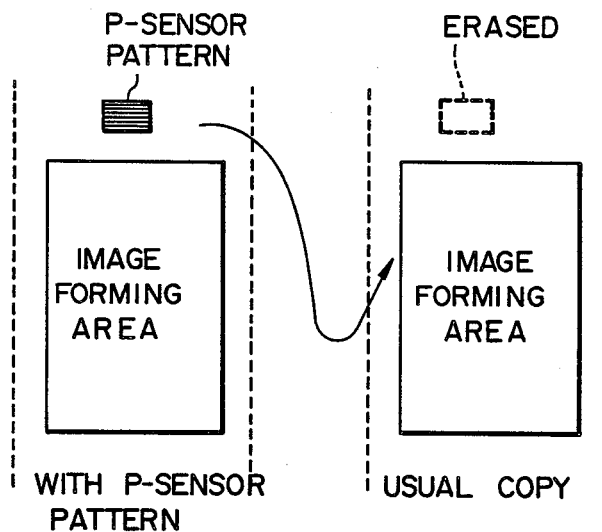
FIG. 32 is a diagram showing a photosensor pattern.
Figure 33:
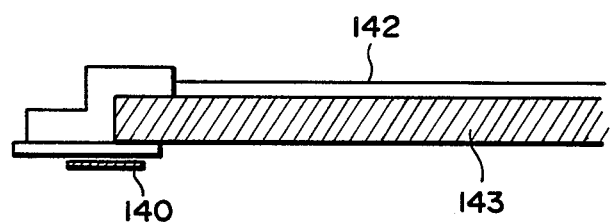
FIG. 33 is a schematic view showing the location of the photosensor pattern.
Figure 34:
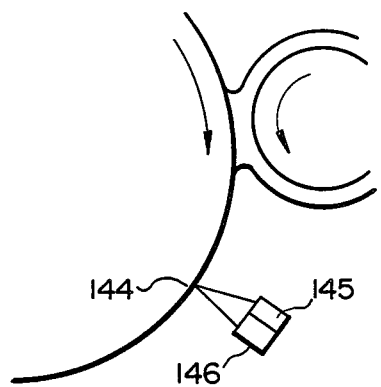
FIG. 34 is a schematic view showing how the photosensor pattern is produced.
Figure 35:
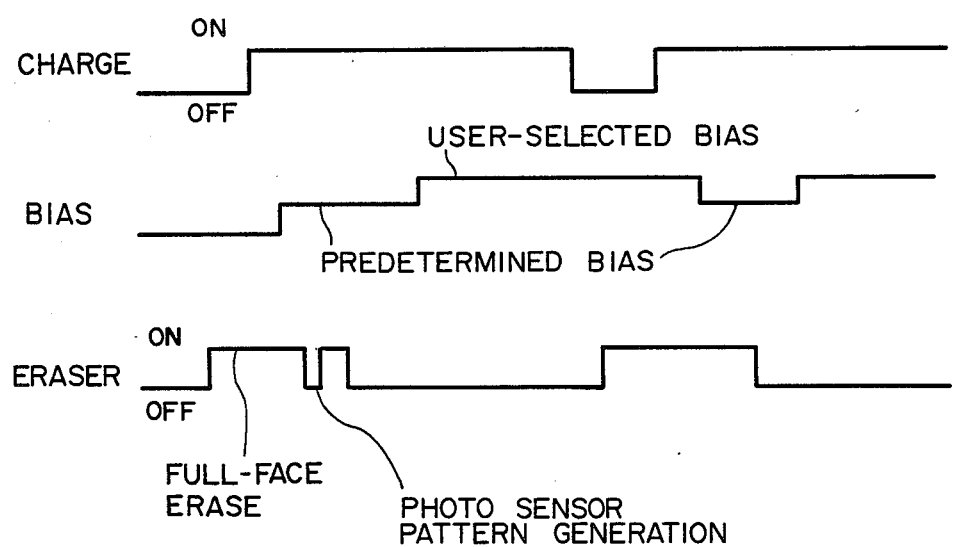
FIG. 35 is a timing chart associated with FIG. 34.

This is a method of defining a timing for turning on the LD in order to generate the PMSYNC signal. For this purpose, the counter 0 of the timer 1 is used and operated in the mode 1. Applied to GATE0 is (PMSYNC). The counter 0 starts counting at the positive-going edge of this signal, and the clock is set such that the LD is turned on at the position of the PMSYNC sensor of FIG. 19 (outside of the drum). Consequently, the LD is prevented from illuminating the drum surface and capable of sensing PMSYNC with a minimum of on-time (FIG. 31). At the time of power-on, the LD is turned on for a predetermined period of time (LDAPC is made high) after the timer has been set so as to apply the PMSYNC signal to GATE0, whereby (PMSYNC) is generated.

In summary, it will be seen that the present invention enhances efficient manipulation of multi-copy and other image editing functions which are available with a digital copier.

Various modifications will be come possible for those skilled in the art after receiving the teachings of the present disclosure without departing from the scope thereof.

What is claimed is:

1. A multi-copy system for a digital copier, comprising:
    store means for storing data which are provided by one main scanning;
    data generating means for generating the data stored in said store means a plurality of times within a period of time of one scanning; and
    discriminating means for discriminating a phantom line, a solid line and like borders between nearby data which are generated by said data generating means.

2. A multi-copy system as claimed in claim 1, further comprising means for limiting generation of data in the main scanning direction to two times and causing said data to be generated by using the center of a paper as a reference.

3. A multi-copy system for a digital copier, comprising:
    image forming means for forming an image on the basis of image data:
    pulse generating means for generating pulses which are synchronous to operations of said image forming means;
    store means for storing image data which are provided by one main scanning performed by said image forming means;
    address means for designating read-out addresses of said store means by counting the pulses which are fed from said pulse generating means;
    clear means for clearing a count of said address means;
    multi-copy commanding means for commanding a multi-copy operation; and
    control means for controlling said clear means such that said clear means clears the count of said address means every time said image forming means completes one main scanning and, when said multi-copy commanding means has commanded a multi-copy operation, clears the count of said address means even when one main scanning is under way.

4. A multi-copy system as claimed in claim 5, wherein a time for said clear means to clear the count of said address means when one main scanning is under way is when said address means reaches a count which is one half a count which is to be cleared when the multi-copy operation is not commanded.

* * * * *